US012007711B2

(12) United States Patent
Yoshida et al.

(10) Patent No.: US 12,007,711 B2
(45) Date of Patent: Jun. 11, 2024

(54) IMAGE FORMING APPARATUS

(71) Applicant: CANON KABUSHIKI KAISHA, Tokyo (JP)

(72) Inventors: Atsushi Yoshida, Chiba (JP); Kenichi Hirota, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 17/324,276

(22) Filed: May 19, 2021

(65) Prior Publication Data

US 2021/0373477 A1 Dec. 2, 2021

(30) Foreign Application Priority Data

Jun. 1, 2020 (JP) ................................ 2020-095408

(51) Int. Cl.
*G03G 15/00* (2006.01)
*B65H 7/10* (2006.01)
(Continued)

(52) U.S. Cl.
CPC .......... *G03G 15/6567* (2013.01); *B65H 7/10* (2013.01); *B65H 9/002* (2013.01); *G03G 15/235* (2013.01); *G03G 15/6564* (2013.01); *B65H 2404/1424* (2013.01); *G03G 15/6579* (2013.01); *G03G 2215/00438* (2013.01)

(58) Field of Classification Search
None
See application file for complete search history.

(56) References Cited

U.S. PATENT DOCUMENTS 4,635,920 A * 1/1987 Kodama ................ B65H 33/08 271/81
4,823,159 A * 4/1989 Yamamoto ............ B65H 9/166 399/394

(Continued)

FOREIGN PATENT DOCUMENTS

CN 2871206 Y 2/2007
CN 101121473 A 2/2008

(Continued)

OTHER PUBLICATIONS

Nov. 12, 2021 European Search Report in European Patent Appln. 21174255.6.

(Continued)

*Primary Examiner* — Jill E Culler
*Assistant Examiner* — Ruben C Parco, Jr.
(74) *Attorney, Agent, or Firm* — Venable LLP

(57) ABSTRACT

An image forming apparatus includes an image forming portion, an oblique movement correcting portion including a first registration roller pair and a first moving portion, a reversing portion, and a re-feeding portion. The reversing portion includes a reversing roller pair and a second moving portion. The re-feeding portion includes a second registration roller pair. When an image is formed on a second surface of a sheet opposite from a first surface of the sheet, a side end position of the sheet is corrected by the second moving portion and oblique movement of the sheet is corrected, and then the side end position of the sheet is corrected again by the first moving means and the sheet is fed to the image forming portion.

9 Claims, 18 Drawing Sheets

(51) Int. Cl.

| | |
|---|---|
| ***B65H 9/00*** | (2006.01) |
| ***G03G 15/23*** | (2006.01) |
| ***G03G 21/00*** | (2006.01) |

(56) References Cited

U.S. PATENT DOCUMENTS

| | | | | |
|---|---|---|---|---|
| 4,878,656 | A | | 11/1989 | Honjo et al. |
| 5,018,716 | A | | 5/1991 | Yoshida et al. |
| 5,105,225 | A | | 4/1992 | Honjo et al. |
| 5,351,112 | A | | 9/1994 | Naito et al. |
| 5,442,431 | A | | 8/1995 | Fujimoto et al. |
| 5,579,083 | A | | 11/1996 | Naito et al. |
| 5,671,917 | A | | 9/1997 | Choho et al. |
| 5,732,620 | A | * | 3/1998 | Christy .............. G03G 21/1638 399/21 |
| 5,819,151 | A | | 10/1998 | Naito et al. |
| 6,021,305 | A | | 2/2000 | Sato et al. |
| 6,032,949 | A | * | 3/2000 | Ando ..................... B65H 9/166 271/902 |
| 6,098,977 | A | | 8/2000 | Sato et al. |
| 7,798,491 | B2 | | 9/2010 | Moteki |
| 8,308,158 | B2 | | 11/2012 | Hirota |
| 8,408,830 | B2 | | 4/2013 | Ogata et al. |
| 8,419,013 | B2 | | 4/2013 | Muneyasu |
| 8,550,456 | B2 | | 10/2013 | Hirota et al. |
| 8,985,578 | B2 | | 3/2015 | Muneyasu |
| 9,193,550 | B2 | | 11/2015 | Muneyasu |
| 10,152,012 | B2 | | 12/2018 | Yoshida et al. |
| 10,280,020 | B2 | | 5/2019 | Yoshida |
| 10,782,639 | B2 | | 9/2020 | Tokuma et al. |
| 11,148,891 | B2 | | 10/2021 | Arai |
| 11,235,597 | B2 | | 2/2022 | Kaneko |
| 11,586,129 | B2 | | 2/2023 | Deno |
| 2007/0075479 | A1 | | 4/2007 | Obuchi |
| 2008/0036137 | A1 | | 2/2008 | Moteki |
| 2008/0054553 | A1 | | 3/2008 | Muneyasu |
| 2008/0251998 | A1 | | 10/2008 | Muneyasu |
| 2009/0154975 | A1 | | 6/2009 | Ogata et al. |
| 2010/0189486 | A1 | | 7/2010 | Inoue |
| 2013/0187331 | A1 | | 7/2013 | Muneyasu |
| 2015/0151939 | A1 | | 6/2015 | Muneyasu |
| 2016/0023858 | A1 | | 1/2016 | Mizuno |
| 2016/0103410 | A1 | | 4/2016 | Yamamoto |
| 2017/0045854 | A1 | | 2/2017 | Miyake |
| 2017/0235254 | A1 | | 8/2017 | Deno |
| 2017/0235265 | A1 | | 8/2017 | Deno |
| 2017/0364008 | A1 | * | 12/2017 | Hayakawa ......... G03G 15/6567 |
| 2019/0072893 | A1 | | 3/2019 | Deno |
| 2019/0101858 | A1 | * | 4/2019 | Kawakami ............. G03G 15/70 |
| 2019/0161298 | A1 | | 5/2019 | Arai |
| 2019/0241385 | A1 | | 8/2019 | Kaneko |
| 2020/0387099 | A1 | | 12/2020 | Tokuma et al. |
| 2021/0009376 | A1 | | 1/2021 | Takezawa et al. |
| 2021/0032064 | A1 | | 2/2021 | Hayashi et al. |

FOREIGN PATENT DOCUMENTS

| | | | | |
|---|---|---|---|---|
| EP | 1764324 | A2 | | 3/2007 |
| JP | H10-129912 | A | | 5/1998 |
| JP | H11-038693 | A | | 2/1999 |
| JP | 2002-003018 | A | | 1/2002 |
| JP | 2006-062851 | A | | 3/2006 |
| JP | 2006-301087 | A | | 11/2006 |
| JP | 2008-074620 | A | | 4/2008 |
| JP | 2009-143643 | A | | 7/2009 |
| JP | 2012-056668 | A | | 3/2012 |
| JP | 2012056668 | A | * | 3/2012 |
| JP | 2017-145091 | A | | 8/2017 |
| JP | 2019-099377 | A | | 6/2019 |
| JP | 2019-136910 | A | | 8/2019 |

OTHER PUBLICATIONS

May 19, 2023 Chinese Official Action in Chinese Patent Appln. No. 202110608683.9.

Jul. 10, 2023 European Official Action in European Patent Appln. No. 23159613.1.

Mar. 12, 2024 Japanese Official Action in Japanese Patent Appln. No. 2020-095408.

* cited by examiner

IMAGE FORMING APPARATUS

FIELD OF THE INVENTION AND RELATED ART

The present invention relates to an image forming apparatus for forming an image on a sheet.

In an image forming apparatus such as a printer, as disclosed in Japanese Laid-Open Patent Application 2009-143643, an oblique movement correcting portion for correcting oblique movement of the sheet and a position of the sheet with respect to a widthwise direction of the sheet perpendicular to a feeding direction of the sheet when the sheet is fed toward an image forming portion for forming an image on the sheet is provided.

The oblique movement correcting portion includes a moving means capable of moving a registration roller pair and a roller pair in the widthwise direction. The oblique movement of the sheet is corrected by formation of a loop by abutting a leading end of the sheet against a nip of the registration roller pair where the leading end of the sheet is at rest. As regards the position of the sheet in the widthwise direction, a position of a side end portion of the sheet subjected to oblique movement correction is detected by a line sensor (for example, a contact image sensor (CIS)) and is moved on the basis of a detection rotation shaft by the moving means in a state in which the sheet is nipped by the registration roller pair.

Further, in order to form a image on a second surface after an image is formed on a first surface of the sheet subjected to the correction by the above-described oblique movement correcting portion, a reversing portion for reversing a leading end and a trailing end of the sheet and a re-feeding portion for re-feeding the sheet, reversed by the reversing portion, to the oblique movement correcting portion are provided.

However, in a period in which the sheet is fed by the reversing portion and the re-feeding portion in order to form the second surface of the sheet after the image is formed on the first surface of the sheet by an image forming portion, there is a liability that a position of the sheet with respect to a widthwise direction of the sheet is largely deviated (shifted).

In this case, before the image is formed on the second surface of the sheet, there is a need to increase a movement amount in which the side end portion of the sheet is moved in the widthwise direction of the sheet by the oblique movement correcting portion. At this time, there is a liability that a degree of the oblique movement of the sheet becomes large.

SUMMARY OF THE INVENTION

A principal object of the present invention is to provide an image forming apparatus capable of reducing a degree of oblique movement of a sheet with movement of a position of a side end portion of the sheet when an image is formed on a first surface of the sheet and thereafter an image is formed on a second surface.

According to an aspect of the present invention, there is provided an image forming apparatus comprising: an image forming portion configured to form an image on a sheet; an oblique movement correcting portion provided upstream of the image forming portion with respect to the sheet feeding direction and including a first registration roller pair for correcting oblique movement of a sheet by abutting a leading end of the sheet against the first registration roller pair and first moving means for moving the sheet in a widthwise direction of the sheet perpendicular to the sheet feeding direction in a state in which the sheet is nipped in the registration roller pair; a reversing portion configured to reverse the leading end and a trailing end of the sheet on which the image is formed on a first surface by the image forming portion; and a re-feeding portion configured to re-feed the sheet reversed by the reversing portion toward the oblique movement correcting portion, wherein the reversing portion includes a reversing roller pair for reversing the sheet by rotating in a first direction while nipping the sheet and then by rotating in a second direction opposite to the first direction, and includes second moving means for moving the sheet in the widthwise direction in a state in which the sheet is nipped by the reversing roller pair, wherein the re-feeding portion includes a second registration roller pair for correcting the oblique movement of the sheet by abutting the leading end of the sheet against the second registration roller pair, and wherein when an image is formed on a second surface of the sheet opposite from the first surface of the sheet, a side end position of the sheet is corrected by the second moving means and the oblique movement of the sheet is corrected, and then the side end position of the sheet is corrected again by the first moving means and the sheet is fed to the image forming portion.

Further features of the present invention will become apparent from the following description of exemplary embodiments with reference to the attached drawings.

DESCRIPTION OF THE EMBODIMENTS

First Embodiment

[General Structure]

Figure 1:
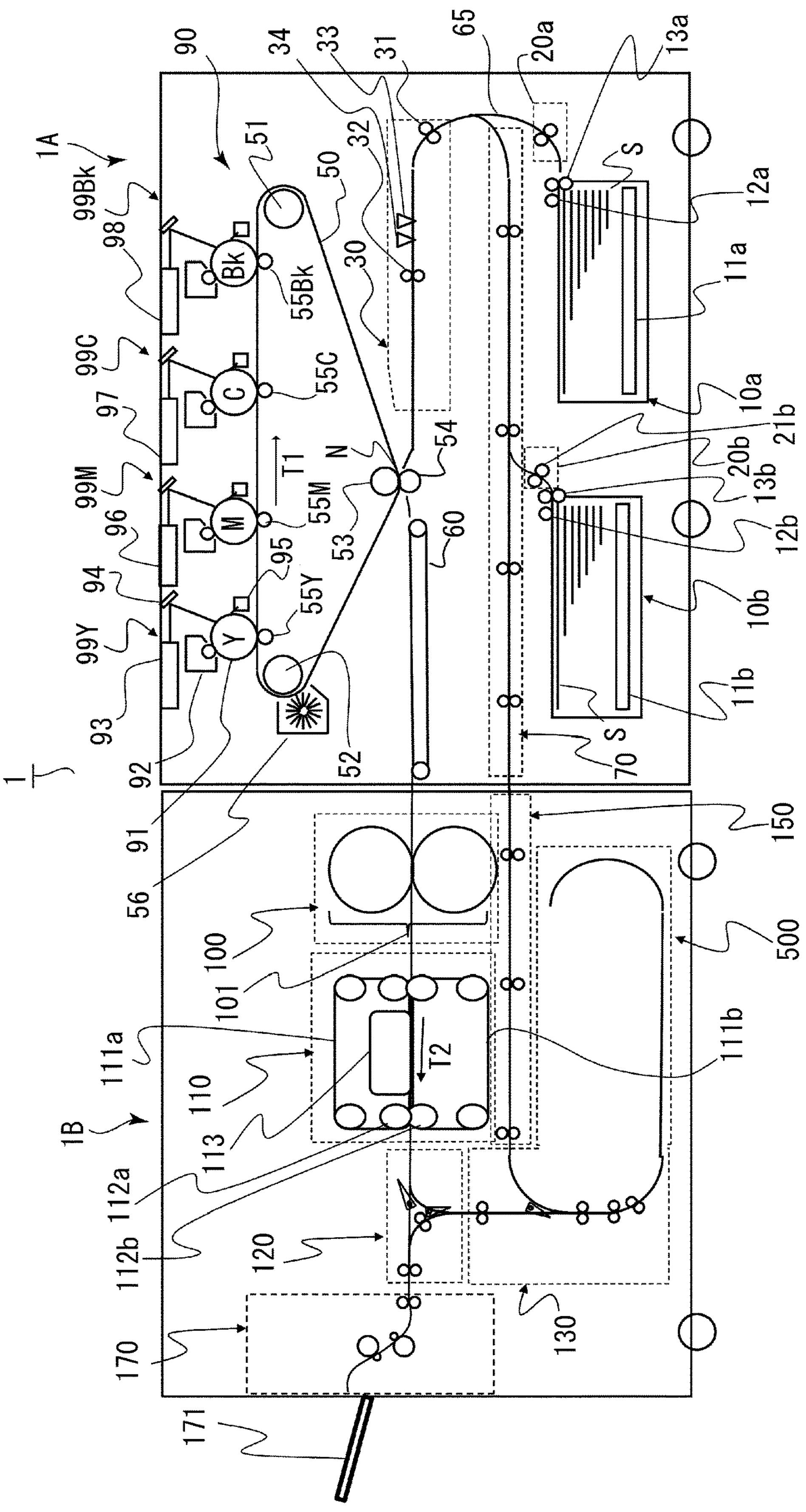
FIG. 1 is a schematic view showing entirety of a printer according to a first embodiment.

First, a first embodiment of the present invention will be described. An image forming apparatus 1 of this embodiment is a full-color laser beam printer of an electrophotographic type. The image forming apparatus 1 includes, as shown in FIG. 1, a casing 1A as a first casing including a unit for carrying out feeding of a sheet and image formation and a casing 1B as a second casing including a unit for carrying out fixing and cooling of the sheet, and the casing 1B is connected to the casing 1A.

The casing 1A includes feeding units 10*a* and 10*b*, drawing units 20*a* and 20*b*, a registration unit 30, an image forming unit 90 and a first double-side feeding unit. The casing 1B includes a fixing unit 100, a cooling unit 110, a branch feeding unit 120, a reverse feeding unit 130, a second double-side feeding unit 150, and a decurling unit 170.

The image forming unit 90 includes four process cartridges 99Y, 99M, 99C and 99Bk for forming toner images of four colors of yellow (Y), magenta (M), cyan (C) and black (Bk), respectively, and includes exposure devices 93, 96, 97 and 98. Incidentally, the four process cartridges 99Y, 99M, 99C and 99Bk have the same constitution except that the colors of images to be formed are different from each other. For this reason, only a constitution and an image forming process of the process cartridge 99Y will be described, and description of the process cartridges 99M, 99C and 99Bk will be omitted.

The process cartridge 99Y includes a photosensitive drum 91, a charging roller (not shown), a developing device 92, and a cleaner 95. The photosensitive drum 91 is constituted by applying an organic photoconductor layer on an outer peripheral surface of an aluminum cylinder and is rotated by a driving motor. Further, the image forming unit 90 is provided with an intermediary transfer belt 50 rotated in an arrow T1 direction by a driving roller 51, and the intermediary transfer belt 50 is extended and wound around a tension roller 51, the driving roller 52 and an inner secondary transfer roller 53. Inside the intermediary transfer belt 50, primary transfer rollers 55Y, 55M, 55C and 55Bk are provided, and outside the intermediary transfer belt 50, an outer secondary transfer roller 54 is provided opposed to the inner secondary transfer roller 53.

The feeding unit 10*a* includes a lift plate 11*a* for raising and lowering sheets S while stacking the sheets S, a pick-up roller 12*a* for feeding the sheets S stacked on the lift plate 11*a*, and a separation roller pair 13*a* for separating the fed sheets S one by one. Similarly, the feeding unit 10*b* includes a lift plate 11*b* for raising and lowering sheets S while stacking the sheets S, a pick-up roller 12*b* for feeding the surfaces S stacked on the lift plate 11*b*, and a separation roller pair 13*b* for separating the fed sheets S one by one.

The registration unit 30 which is a first oblique movement correcting portion includes a pre-registration roller pair 31 for feeding the sheet S and a registration roller pair 32 as a first registration roller pair for correcting oblique movement of the sheet S. Further, the registration unit 30 includes a registration sensor 33 for detecting a position of the sheet S with respect to a sheet feeding direction and a contact image sensor (CIS) 34 as a first side end detecting portion for detecting a position of the sheet S with respect to a widthwise direction of the sheet S. The fixing unit 100 includes a fixing roller pair 101 capable of heating the sheet S.

The cooling unit 110 includes an upper cooling belt 111*a* rotatable in an arrow T2 direction by an upper cooling (belt) driving roller 112*a*. Further, the cooling unit 110 includes a lower cooling belt 111*b* rotatable in the arrow T2 direction by a lower cooling (belt) driving roller 112*b* and a heat sink 113 for cooling the sheet S.

Next, an image forming operation of the thus-constituted image forming apparatus 1 will be described. When an image signal is inputted from a personal computer or the like to the exposure device 93, the photosensitive drum 91 of the process cartridge 99Y is exposed to laser light, corresponding to the image signal, emitted from the exposure device 93.

At this time, a surface of the photosensitive drum 91 is electrically charged uniformly to a predetermined polarity and a predetermined potential in advance by the charging roller, and is exposed to the laser light from the exposure device 93 through a mirror 94, so that an electrophotographic latent image is formed on the surface of the photosensitive drum 91. The electrostatic latent image formed on the photosensitive drum 91 is developed by the developing device 92, so that a toner image of yellow (Y) is formed on the photosensitive drum 91.

Similarly, the photosensitive drums of the process cartridges 99M, 99C and 99Bk are also exposed to the laser light from the exposure devices 96, 97 and 98, respectively, so that toner images of magenta (M), cyan (C) and black (Bk) are formed on the associated photosensitive drums. The toner images of the respective colors formed on the photosensitive drums are primary-transferred onto the intermediary transfer belt 50 by the primary transfer rollers 55Y, 55M, 55C and 55Bk. Then, a resultant full-color toner image is fed to a secondary transfer nip N, formed by the inner secondary transfer roller 53 and the outer secondary transfer roller 54, by the intermediary transfer belt 50. Incidentally, an image forming process for the respective colors are carried out at a timing when the associated toner image is superposed on an upstream toner image primary-transferred on the intermediary transfer belt 50.

In parallel to this image forming process, the sheet S is fed from either one of the feeding units 10*a* and 10*b* and is conveyed to the registration unit 30 by associated either one of the drawing units 20*a* and 20*b*. In the registration unit 30, the pre-registration roller pair 31 abuts a leading end of the sheet S against a nip of the registration roller pair 32 being at rest. By that, oblique movement of the sheet S is corrected, and then the sheet S is fed to the secondary transfer nip N as an image forming portion at a predetermined feeding timing. Onto a first surface (front surface) of the sheet S, by a secondary transfer bias applied to the outer secondary transfer roller 54, the full-color toner image is transferred from the outer secondary transfer roller 54. Transfer residual toner remaining on the intermediary transfer belt 50 is collected by a belt cleaner 56.

The sheet S on which the toner image is transferred is conveyed to the fixing unit 100 by a pre-fixing feeding portion 60. Then, the sheet S is guided to a nip of a fixing roller pair 101, and predetermined heat and predetermined pressure are applied to the sheet S, so that the toner (image) is melted and stuck (fixed) on the sheet S. The sheet S passed through the fixing unit 100 is conveyed in the cooling unit 110 while being nipped by the upper cooling belt 111*a* and the lower cooling belt 111*b*. Further, the heat of the sheet S is transferred to the heat sink 113 through the upper cooling belt 111*a*, so that the sheet S is cooled.

Subsequently, by the branch feeding unit 120, route selection as to whether the sheet S is conveyed to the decurling unit 170 or the reverse feeding unit 130 is made. Incidentally, after the sheet S is conveyed to the reverse feeding unit 130, the sheet S can also be conveyed to the decurling unit 170 after being reversed so that the first surface on which the image is transferred at the secondary transfer nip N is turned upside down.

In the case where the image is formed on only one surface (side), the sheet S is fed from the branch feeding unit 120 to the decurling unit 170, in which curling of the sheet S is corrected by a small-diameter hard roller and a larger diameter hard roller. Then, the sheet S passed through the decurling unit 170 is discharged onto a discharge tray 171.

In the case where the images are formed on double surfaces (sides), the sheet S is fed to the reverse feeding unit 130 by the branch feeding unit 120. In the reverse feeding unit 130, a switch-back operation for reversing the leading end and a trailing end of the sheet S is performed. The switch-backed sheet S is fed from the reverse feeding unit 130 to the double-side feeding unit 150 and then to the first double-side feeding unit 70, and then is guided to the registration unit 30. Thereafter, the image is formed on the second surface (back surface) of the sheet S in the secondary transfer nip N and the sheet S is discharged through the branch feeding unit 120 and the decurling unit 170.

The branch feeding unit 120, the reverse feeding unit 130, the double-side feeding unit 150 and the first double-side feeding unit 70 constitute the re-feeding portion 500 for reversing the front and back surfaces (sides) of the sheet S on which the image is formed on the first surface and then the sheet S is fed again to the secondary transfer nip N.

Incidentally, in the image forming apparatus 1 according to this embodiment, description will be further made on the assumption that a sheet feeding type on a center(-line) basis in which the sheet is fed in a state in which a center of a feeding passage 65 with respect to the widthwise direction perpendicular to the feeding direction and a center of the sheet S with respect to the widthwise direction coincide with each other is employed, for example.

[Registration Unit]

Figure 2:
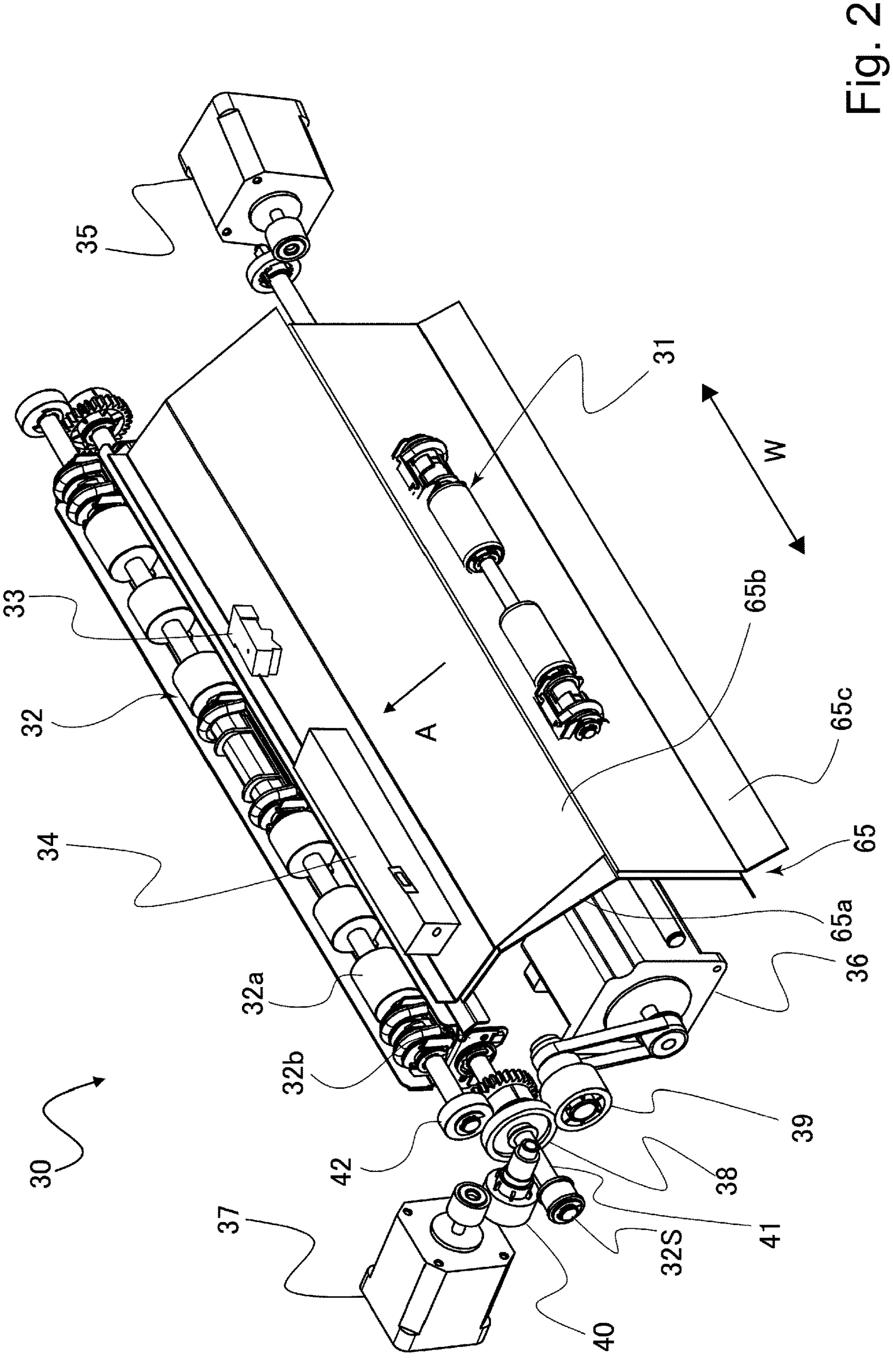
FIG. 2 is a perspective view showing a registration unit.

The registration unit 30 is provided, as shown in FIGS. 1 and 2, in the feeding passage 65 connecting the drawing unit 20*a* and the secondary transfer nip N. Further, the registration unit 30 includes the registration roller pair 32, the pre-registration roller pair 31, the registration sensor 33, and the CIS 34. The pre-registration roller pair 31 is disposed upstream of the registration roller pair 32 with respect to a sheet feeding direction A, and the registration sensor 33 and the CIS 34 are disposed between these roller pairs.

The registration roller pair 32 includes, as shown in FIG. 2, an upper roller 32*a* as a first roller and a lower roller 32*b* as a second roller fixed on a rotation shaft 32S. To the rotation shaft 32S, an input gear 38 is fixed, and the input gear 38 is driven by a registration driving motor 36 through an idler gear 39. Further, the pre-registration roller pair 31 is driven by a pre-registration driving motor 35. Incidentally, each of the pre-registration roller pair 31 and the registration roller pair 32 rotates about a shift extending in a widthwise direction W.

On the rotation shaft 32S, a rack 41 is supported so as not to be rotatable relative to the rotation shaft 32S and so as not to be movable in an axial direction of the rotation shaft 32S. The rack 41 receives a driving force from a shift motor 37 which is a first moving means through a pinion gear 40 and shifts the rotation shaft 32S in the axial direction. Further, the upper roller 32*a* shifts in the axial direction in interrelation with the lower roller 32*b* in a state in which a flange portion 42 provided integrally with the upper roller 32*a* is nipped by the input gear 38 of the lower roller 32*b*. The registration roller pair 32 in a state in which the sheet S is nipped thereby moves in the widthwise direction W perpendicular to the feeding direction A, so that the sheet S moves in the widthwise direction W and a position of the sheet S with respect to the widthwise direction W is corrected.

Incidentally, compared with the input gear 38, the idler gear 39 is broad in face width. This is because even in the case where the registration roller pair 32 and the input gear 38 move in the widthwise direction W, engagement between the gears is maintained and thus rotation of the registration roller pair 32 is enabled.

The CIS 34 detects a position of a sheet end portion with respect to the widthwise direction W of the sheet S to be fed (hereinafter, this position is referred to as an end portion position). A controller 200 (FIG. 3) calculates a deviation amount between a sheet design reference position and the end portion position detected by the CIS 34, and causes the registration roller pair 32 to perform a shift operation by an amount corresponding to this deviation amount. By this, a position of the sheet S with respect to the widthwise direction W of the sheet S and a transfer position in the image forming unit 90 coincide with each other, so that a high-quality product is obtained.

Incidentally, the CIS 34 is disposed at a position biased to one end side relative to a center of a feeding passage 65 with respect to the widthwise direction W. This is because in position correction of the sheet S with respect to the widthwise direction W, the end portion position of the sheet S only on one side may only be required to be detected. Further, the CIS 34 is constituted so that the end portion position of each of sheets with a smallest width and a largest width of sheet sizes which are allowed to be used in the image forming apparatus 1. Further, the CIS 34 is disposed in the neighborhood of the registration roller pair 32 to the extent possible so as not to lower detection accuracy of the CIS 34.

Further, in the registration unit 30, the oblique movement of the sheet S is corrected by abutting the leading end of the fed sheet S against the nip of the registration roller pair 32 being at rest and thus by flexing the leading end of the sheet S along the nip of the registration roller pair 32. The sheet S is fed by the registration roller pair 32 after the sheet S is sent in a predetermined amount by the pre-registration roller pair 31 from detection of the leading end of the sheet S by the registration sensor 33, and thus is fed to the secondary transfer nip N.

Further, a gap between the CIS 34 and a lower guide 65*a* opposing the CIS 34 is kept at a certain distance, so that in the feeding passage 65, a predetermined space is formed by the lower guide 65*a* and upper guides 65*b* and 65*c* so that the sheet S can be flexed. A feeding amount of the sheet S by the pre-registration roller pair 31 is set so that flexure of the sheet S in an appropriate amount is formed.

[Control Block]

Figure 3:
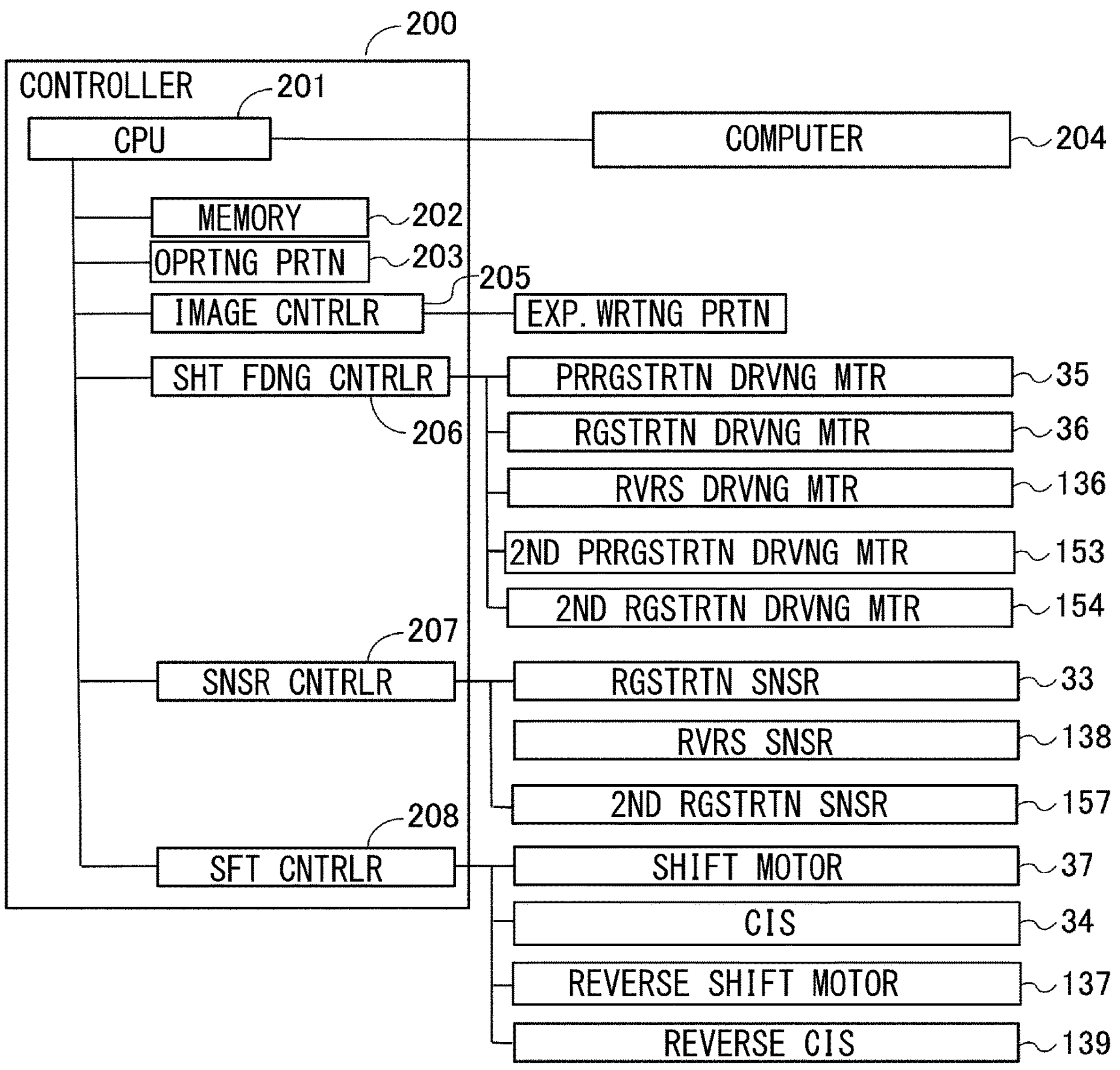
FIG. 3 is a control block diagram showing a controller.

FIG. 3 is a control block diagram showing the controller 200 of the image forming apparatus 1. The controller 200 includes a CPU 201, a memory 302, an operating portion 203, an image formation controller 205, a sheet feeding controller 206, a sensor controller 207, and a shift controller 208. The CPU 201 executes predetermined control programs or the like and thus realizes various processes carried out by the image forming apparatus 1. The memory 202 is constituted by, for example, a RAM and a ROM, and stores various programs and various data in a predetermined storing area. The operating portion 203 receives input of various pieces of information (for example, a sheet size, a basis weight of the sheet, a surface property of the sheet, and the like), and execution and interruption of a job, and the like.

The image formation controller 205 controls an image forming operation by providing instructions to the image forming unit 90 including the exposure devices 93, 96, 97, and 98. The sheet feeding controller 206 provides instructions to the pre-registration driving motor 35, the registration driving motor 36, a reverse driving motor 136, a second pre-registration driving motor 153, and a second registration driving motor 154, and the like. By this, a feeding operation of the sheet S is controlled. The sensor controller 207 provides instruction to start and stop detection by the registration sensor 33, a reverse sensor 138, and a second registration sensor 157, and the like, and receives detection results of these sensors.

The shift controller 208 receives results of the CIS 34 and a reverse CIS 139 and provides instructions to start and stop the shift motor 37 and a reverse shift motor 137 and the like instruction, and thus controls movement of the sheet S in the widthwise direction W, i.e., a shift operation. Further, the CPU 201 is capable of being connected to an external computer 204 connected through a network, for example, and is capable of receiving various pieces of information on the sheet, a print job, and the like.

[Oblique Movement Correcting Operation and Shift Operation by Registration Unit]

Figure 4:
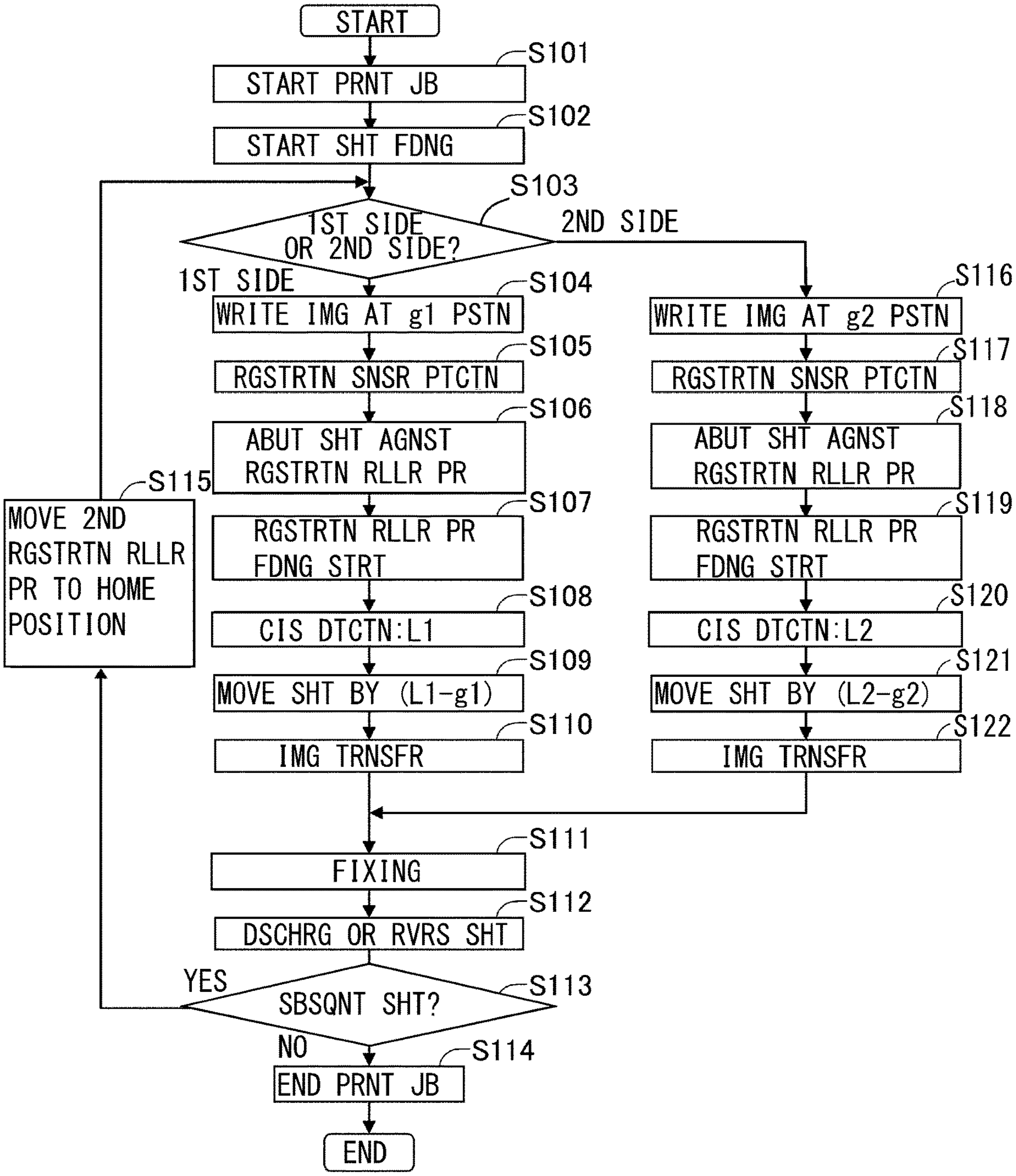
FIG. 4 is a flowchart showing an oblique movement correcting operation and a shifting operation of a sheet by the registration unit.

Next, along a flowchart shown in FIG. 4, an oblique movement correcting operation and a shift operation by the registration unit 30 will be described. First, when a print instruction is inputted from the operating portion 203 or the computer 204, the controller 200 starts a print job (step S101). Incidentally, a user can provide not only an instruction about the number of printed sheets and the like but also an instruction about a kind of the sheet used in the printing, and the like.

The controller 200 starts feeding of the sheet S (step S102), and discriminates whether the printing is printing on a first surface of the sheet S or printing on a second surface of the sheet S in the print job (step S103). When the printing is discriminated as the printing on the first surface of the sheet S, the controller 200 controls the image forming unit 90 so that a toner image is formed on the intermediary transfer belt 50 at an image writing position g1 determined in advance (step S104). Here, the image writing position g1 is a value based on a result of a writing position adjustment made during factory shipment, and is stored as a fixed value intrinsic to an apparatus main assembly in the memory 202.

Specifically, the controller 200 controls the exposure devices 93, 96, 97 and 98 so that electrostatic latent images are formed at the image writing positions g1 on the respective photosensitive drums of the process cartridge 99Y, 99M, 99C and 99K. Then, as described above, the electrostatic latent images are developed as toner images by the developing devices, and these toner images are transferred onto the intermediary transfer belt 50 by the primary transfer rollers 55Y, 55M, 55C and 55K.

Figure 5A:
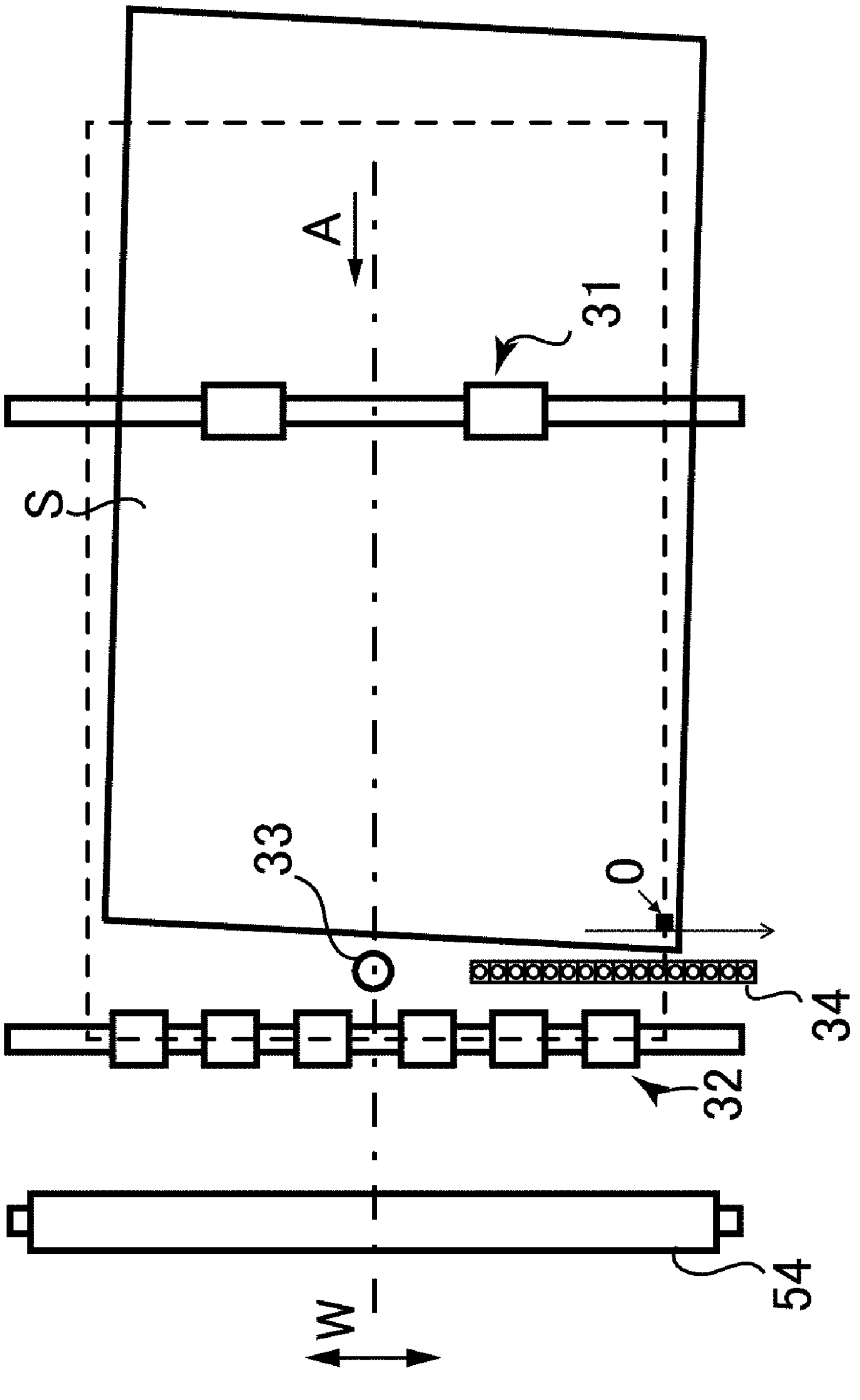
FIG. 5A is a (top) plan view showing a state in which an obliquely moved sheet is fed to the registration unit.

On the other hand, the sheet S is fed to the pre-registration roller pair 31. Here, it is assumed that the sheet S is, as shown in FIG. 5A, in a state in which the sheet S is rotated clockwise and obliquely moved in the feeding direction A and thus is shifted to a left-hand side with respect to the feeding direction A. Incidentally, broken-line rectangular portions shown in FIGS. 5A to 5D schematic show a state in which the leading end of the sheet S fed without being obliquely moved and laterally deviated (shifted) contact the nip of the registration roller pair 32. Further, the end portion position of the sheet S with respect to the widthwise direction W at this time is taken as a zero point (position), and a left-hand side is taken as a positive direction.

Figure 5B:
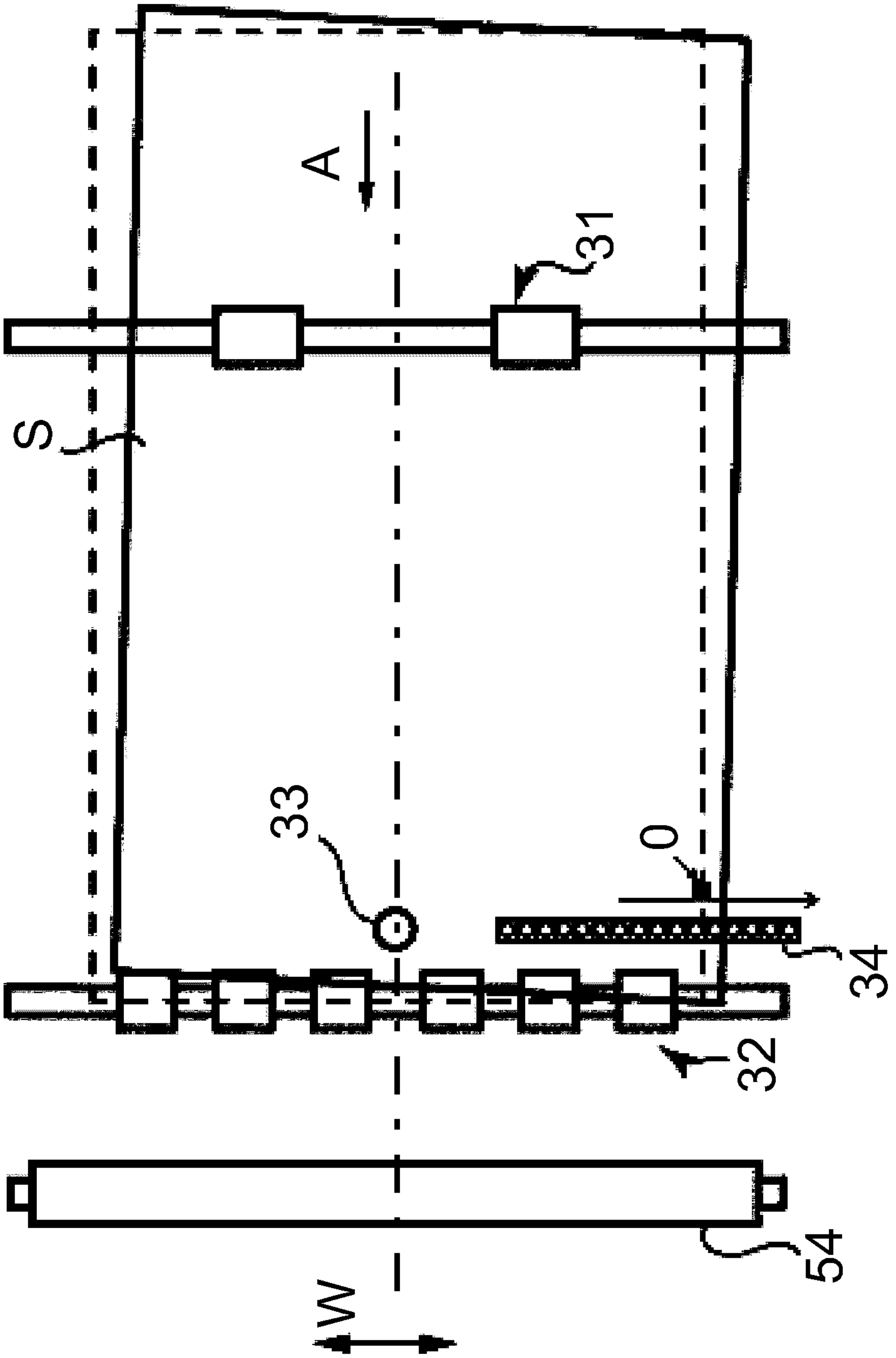
FIG. 5B is a plan view showing a state in which an end portion position of the sheet is detected by the registration unit.
Figure 5C:
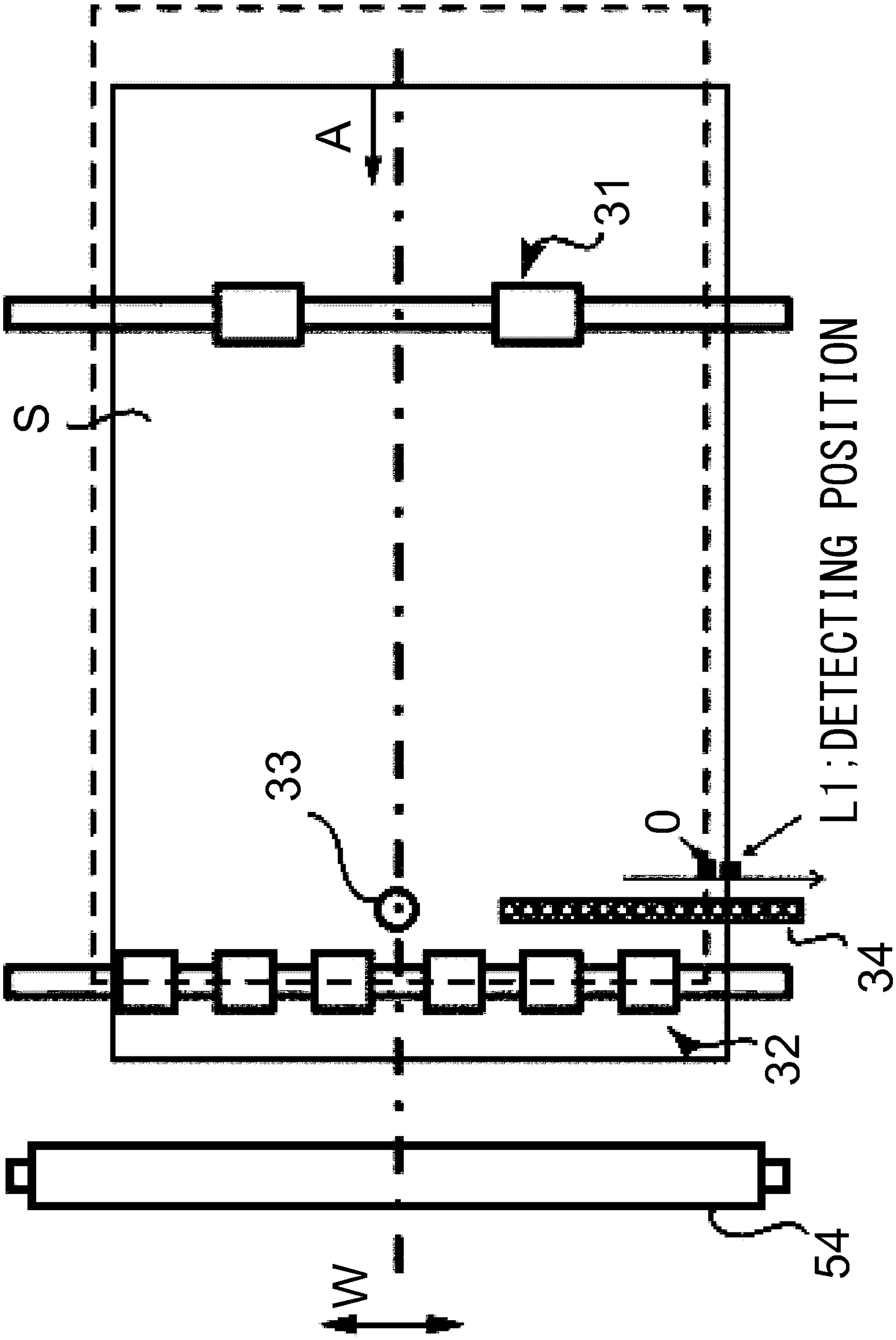
FIG. 5C is a plan view showing a state in which the sheet is fed by a registration roller pair.
Figure 5D:
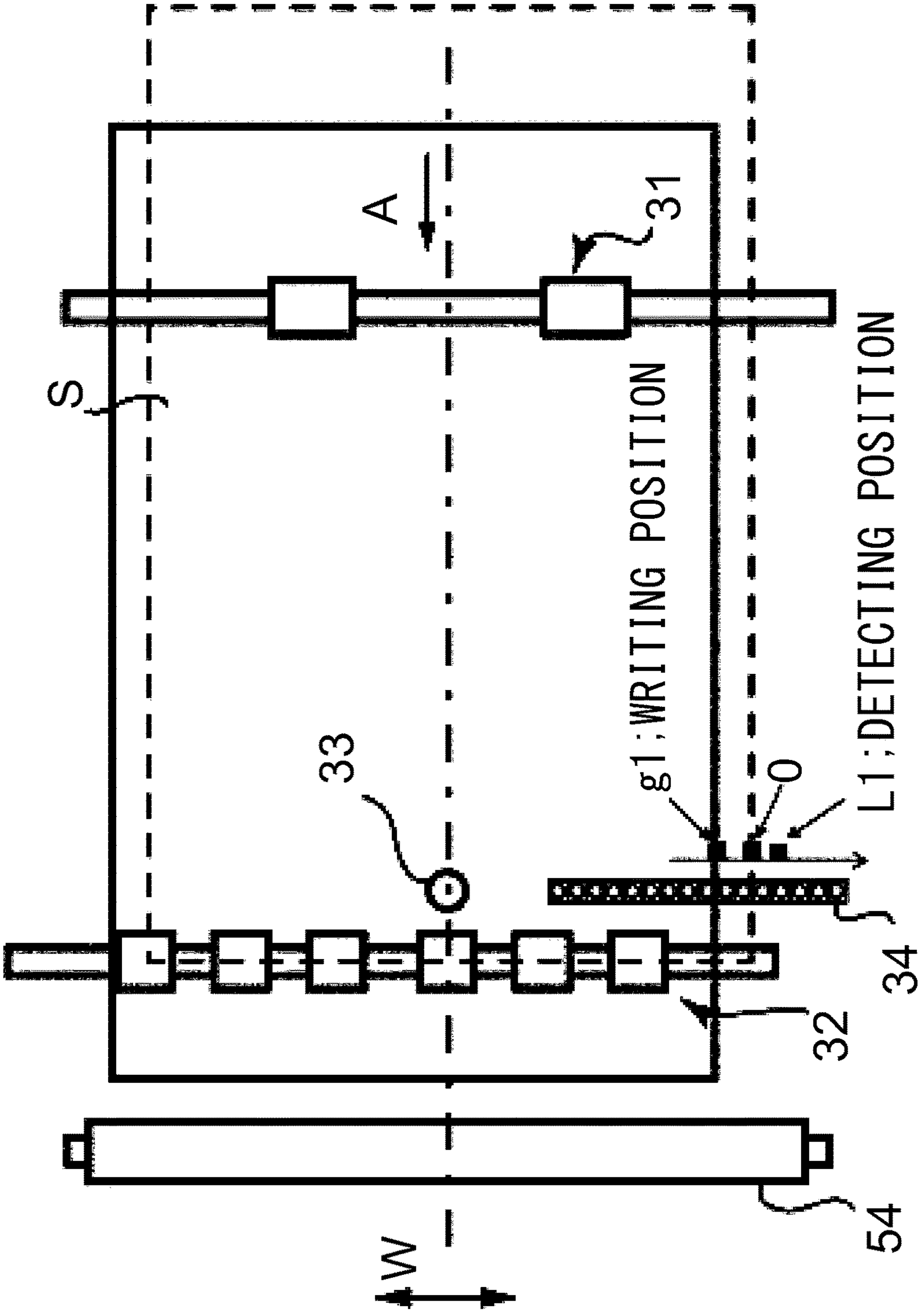
FIG. 5D is a plan view showing the sheet subjected to the image forming operation by the registration roller pair.

Then, the controller 200 sends the sheet S in a set sending amount by the pre-registration roller pair 31 on the basis of a detection result (step S105). By this, the sheet S is abutted against the registration roller pair 32 being at rest, so that flexure in a predetermined amount is formed as shown in FIG. 5B (step S106). Thus, oblique movement correction of the sheet S is carried out, and then the sheet S is nipped and fed by the registration roller pair 32 of which rotational drive is started as shown in FIG. 5C (step S107).

Then, the sheet S after the oblique movement correction is carried out is subjected to detection of the end portion position thereof by the CIS 34 (step S108), and the controller 200 calculates a shift amount of the sheet S on the basis of this detection result (L1). The shift amount in this case can be acquired by subtracting the image writing position (g1) from the detection result (L1) of the CIS 34 (L1−g1).

The controller 200 moves the registration roller pair 32 nipping the sheet S in the widthwise direction W by the shift amount (L1−g1). By this, the sheet S is moved in the widthwise direction W by the shift amount (L1−g1) (step S109). As a result, the position of the sheet S with respect to the widthwise direction W is corrected correspondingly to the image writing position g1.

Then, onto the sheet S shifted in the shift amount (L1−g1) by the registration roller pair 32, the toner image on the intermediary transfer belt 50 is transferred in the secondary transfer nip N (step S110). Thereafter, this toner image is melted and fixed by the fixing unit 100 (step S111).

In the case of a one-side job, the sheet S on which the toner image is fixed is discharged on the discharge tray 171 and the job is ended (step S112), but in the case of a double-side job, the sheet S is subjected to a reversing process for image formation on the second surface. Then, the controller 200 discriminates whether or not a subsequent sheet exists (step S113). In the case where the controller 200 discriminates that there is no subsequent sheet (step S113: No), the print job is ended (step S114). Further, in the case where the controller 200 discriminates that the subsequent sheet exists (step S113: Yes), the controller 200 returns the registration roller pair 32 to a home position (center position) (step S115). Thereafter, the sequence goes to the process of the step S103.

In the case where the controller 200 discriminates that the printing is the printing on the second surface of the sheet S in the print job, the controller 200 controls the image forming unit 90 so that the toner image is formed at an image writing position g2 of the second surface (step S116). Incidentally, the image writing position g2 of the second surface may also be the same position as or be different from the image writing position g1 of the first surface with respect to the widthwise direction. An oblique movement correcting operation for the sheet on which the image is formed on the second surface is the same as the oblique movement correcting operation for the sheet on which the image is formed on the first surface, and therefore, description thereof will be omitted (steps S117 to S119).

Then, the sheet S after the oblique movement correction is carried out is subjected to detection of the end portion position thereof at the second surface by the CIS 34 (step S120), and the controller 200 calculates a shift amount of the sheet S on the basis of this detection result (L2). The shift amount in this case can be acquired by subtracting the image writing position (g2) from the detection result (L2) of the CIS 34 (L2−g2).

The controller 200 moves the registration roller pair 32 nipping the sheet S in the widthwise direction W by the shift amount (L2−g2). By this, the sheet S is moved in the widthwise direction W by the shift amount (L2−g2) (step S121). For example, in the case of the second surface image writing position G2=g1=0, the sheet S is shifted by the shift amount L2, so that the sheet S is moved to a position which is the same position as the position of the sheet S before the image is formed on the first surface. By this, not only the positions of the images formed on the first surface and the second surface of the sheet S coincide with each other, but also these images are formed at a central portion of the sheet S and thus a high-quality product can be obtained.

Then, onto the sheet S shifted in the shift amount (L2−g2) by the registration roller pair 32, the toner image on the intermediary transfer belt 50 is transferred in the secondary transfer nip N (step S122). Thereafter, similarly as in the process for the first surface, this toner image is melted and fixed by the fixing unit 100, and the sheet is discharged on the discharge tray 171 (steps S111 and S112).

Here, the printing on the second surface results in feeding of the sheet S in a long distance after the sheet for the printing on the first surface is subjected to correction of the oblique movement and the lateral deviation, and therefore, degrees of the oblique movement and the lateral deviation becomes larger than those in the printing on the first surface due to variation of component parts of the respective units in many instances. For that reason, the shift amount of the registration roller pair 32 becomes large. When the registration roller pair 32 shifts, in the case where the sheet S has a large sliding resistance with a feeding guide member, particularly in the case where a size of the sheet S is large, the sheet S is nipped by other rollers, and therefore, the resistance is large. As a result, in the case where the shift amount is large, when the registration roller pair 32 is shifted by these resistances, it can occur that the sheet S causes the oblique movement, a decrease in shift amount than an assumed amount, and creases.

Further, in the case where the shift amount is large, there is a need to take much time to shift the registration roller pair 32 and much time to return the registration roller pair 32 to the home position (center position) after the sheet S passes through the registration roller pair 32. By that, there is a liability that productivity is not ensured. In order to solve the above-described problems, in this embodiment, a shifting operation (lateral deviation shift) of the sheet S is also performed by the reverse feeding unit 139.

[Reverse Feeding Unit]

Figure 6:
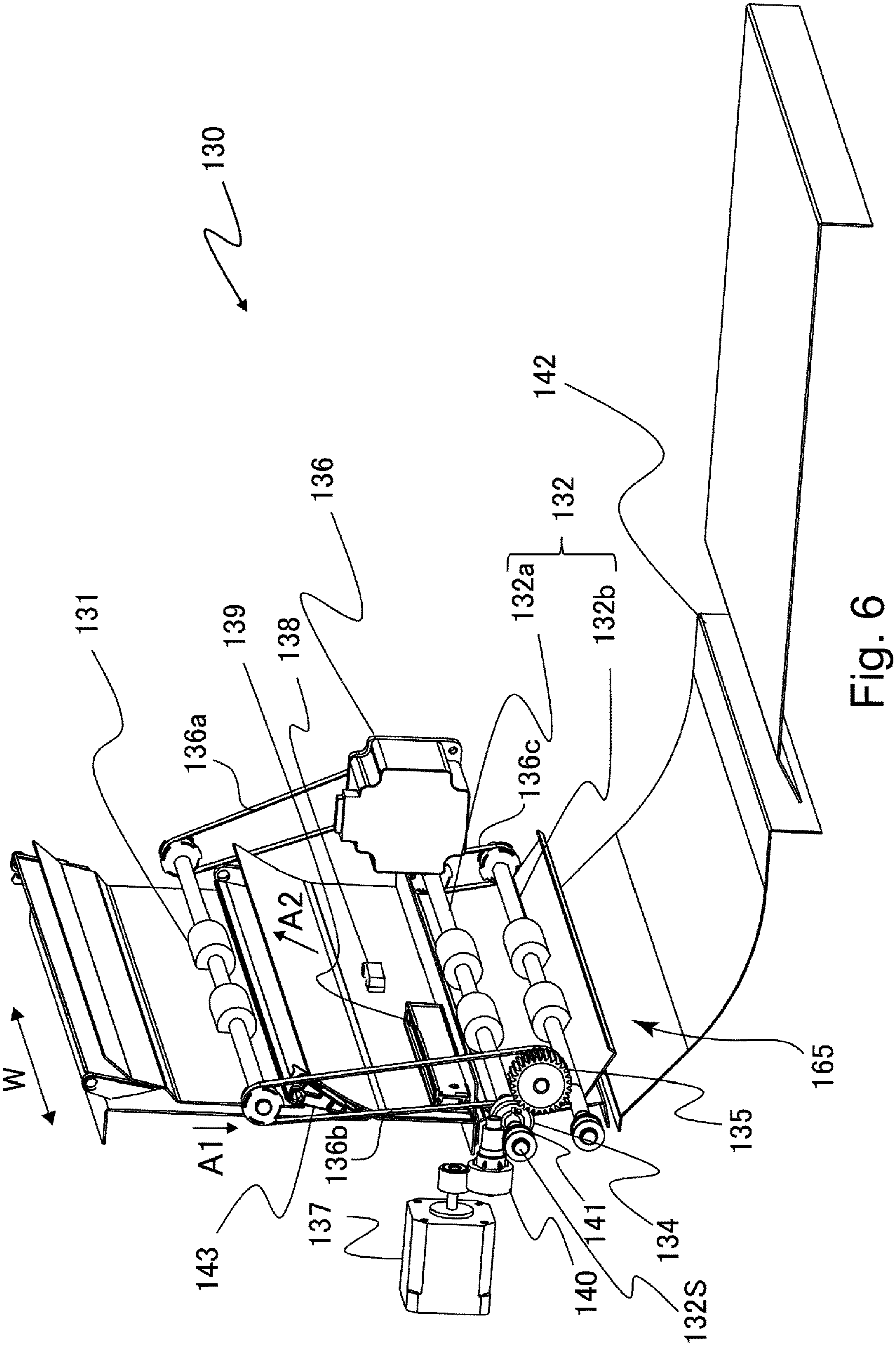
FIG. 6 is a perspective view showing a reverse feeding unit.

Next, a structure of the reverse feeding unit 130 will be described. The reverse feeding unit 130 as a reversing portion includes, as shown in FIG. 6, a feeding roller pair 131, a reverse shift portion 132, a reverse sensor 138, a reverse CIS 139 as a second side end detecting portion, and a switching member 143. The reverse shift portion 132 includes a first reverse shift roller pair 132*a* and a second reverse shift roller pair 132*b* which are reverse roller pairs, and the reverse sensor 138 and the reverse CIS 139 are provided between the feeding roller pair 131 and the first reverse shift roller pair 132*a*.

The feeding roller pair 131 is driven by the reverse feeding motor 136 through a belt 136*a*. Further, rotation of the feeding roller pair 131 is transmitted to an idler gear 135 through a belt 136*b*. To a rotation shaft 132S of the first reverse shift roller pair 132*a*, an input gear 134 is fixed, and the input gear 134 is driven by the idler gear 135. Further, the first reverse shift roller pair 132*a* and the second reverse shift roller pair 132*b* are connected to each other by a belt 136*c* and are constituted so as to be interrelated with each other. Incidentally, each of the first reverse shift roller pair 132*a* and the second reverse shift roller pair 132*b* is rotated about associated shafts extending in the widthwise direction W. For example, the first reverse shift roller pair 132*a* includes a third roller and a fourth roller each being rotated about an associated shaft extending in the widthwise direction W, and these third and fourth rollers are moved in the widthwise direction W in a state in which the sheet S is nipped therebetween.

On the rotation shaft 132S, a rack 141 is supported so as not to rotatable relative to the rotation shaft 132S and so as not to be movable in an axial direction. The rack 141 receives a driving force from the reverse shift motor 137 which is a second moving means through a pinion gear 140, and shifts the rotation shaft 132S in the axial direction. The sheet S is moved in the widthwise direction W by moving, in the widthwise direction W, the first reverse shift roller pair 132*a* and the second reverse shift roller pair 132*b* in a state in which the sheet S is nipped therebetween, so that the position of the sheet S with respect to the widthwise direction W is corrected. By this, the shifting operation by the reverse feeding unit 130 is realized.

Incidentally, compared with the input gear 132, the idler gear 35 is broad in face width. This is because even in the case where the first reverse shift roller pair 132*a* and the second reverse shift roller pair 132*b* are moved in the widthwise direction W, engagement of the gears is kept and rotations of the reverse shift portion 132 is enabled.

The reverse CIS 139 is disposed at a position biased to one side relative to a center of the reverse feeding passage 165 with respect to the widthwise direction W, and detects an end portion position of the fed sheet S with respect to the widthwise direction W. This is because in the position correction of the sheet S, the end portion position of the sheet S only on one side only be required to be detected. Further, the reverse CIS 139 is disposed in the neighborhood of the first reverse shift roller pair 132*a* to the extent possible in order to prevent detection accuracy of the reverse CIS 139 from lowering.

[Shifting Operation by Reverse Feeding Unit]

Figure 7:
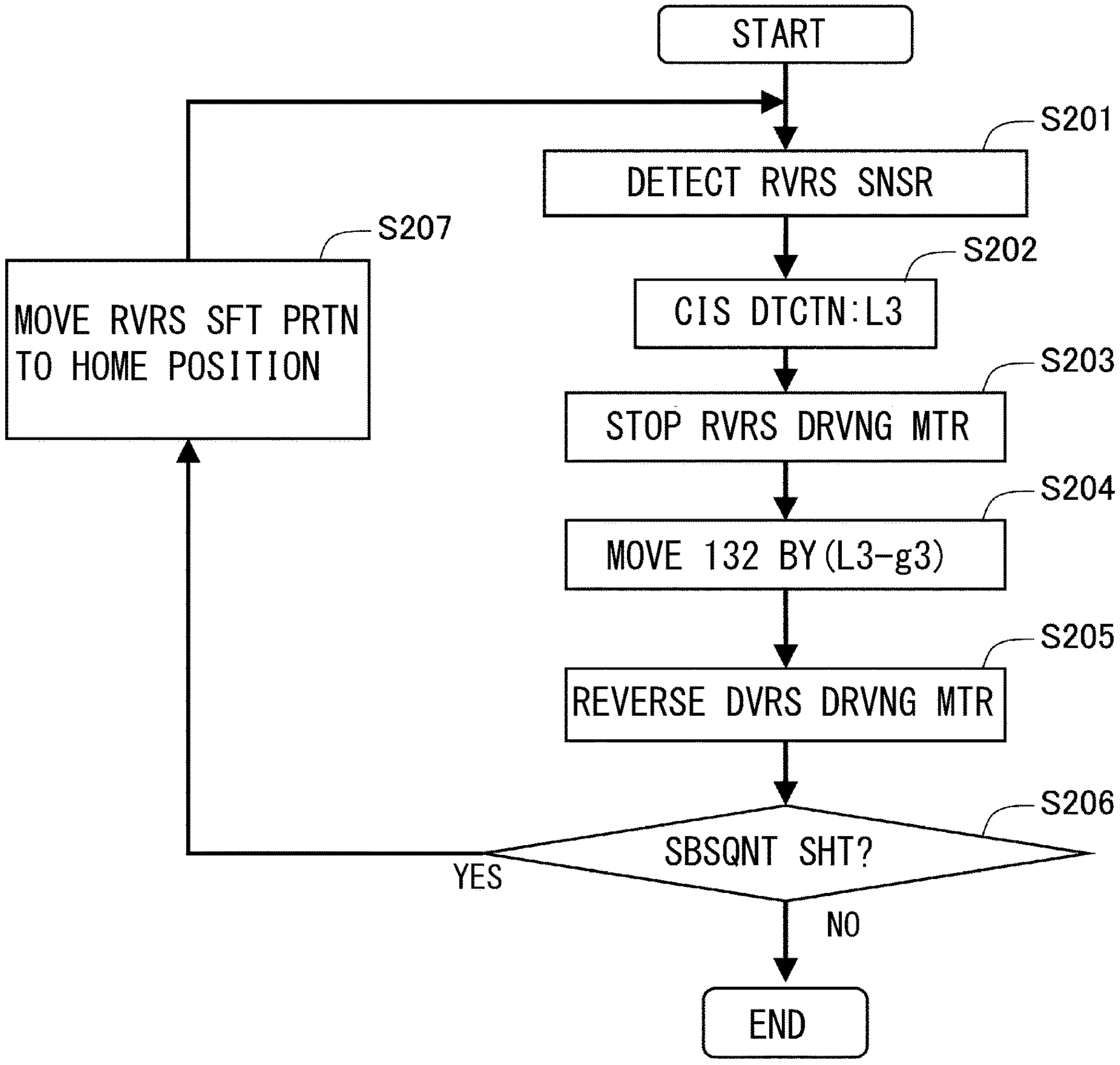
FIG. 7 is a flowchart showing the shifting operation of the sheet by the reverse feeding unit.
Figure 8A:
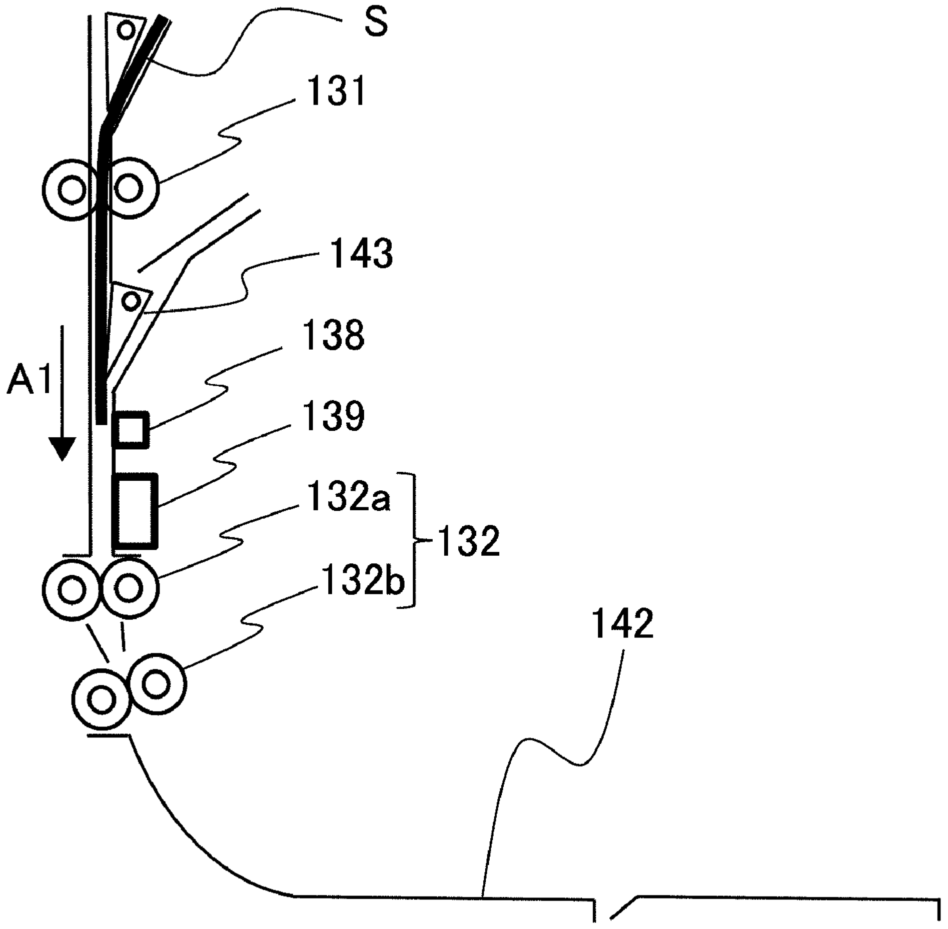
FIG. 8A is a schematic view showing a state in which the sheet is fed toward a reverse shifting portion.

Next, along a flowchart shown in FIG. 7, a shifting operation by the reverse feeding unit 130 will be described. In the case where the print job is double-side printing, the sheet S on which the image is formed on the first surface is fed to the reverse feeding unit 130 by the branch feeding unit 120. The switching member 143 of the reverse feeding unit 130 is urged by an urging member in a positioned state as shown in FIG. 8A.

The sheet S fed from the branch feeding unit 120 is fed to the feeding roller pair 131 and then is fed while pressing the switching member 143 against an urging force of the urging member. Subsequently, a position of the sheet S with respect to the feeding direction A is detected by the reverse sensor 138 (step S201). Thereafter, an end portion position of the sheet S is detected by the reverse CIS 139 (step S202). The controller 200 calculates a shift amount on the basis of this detection result (L3) and a deviation amount (g3). The deviation amount (g3) is an amount which is acquired in advance during installation of the image forming apparatus 1 or the like and in which the sheet S is deviated (shifted) in the widthwise direction W when the sheet S is fed from the reverse feeding unit 130 to the registration unit 30. Further, the shift amount of the sheet S can be acquired by subtracting the deviation amount (g3) from the detection result (L3) of the reverse CIS 139 (L3−g3).

Figure 8B:
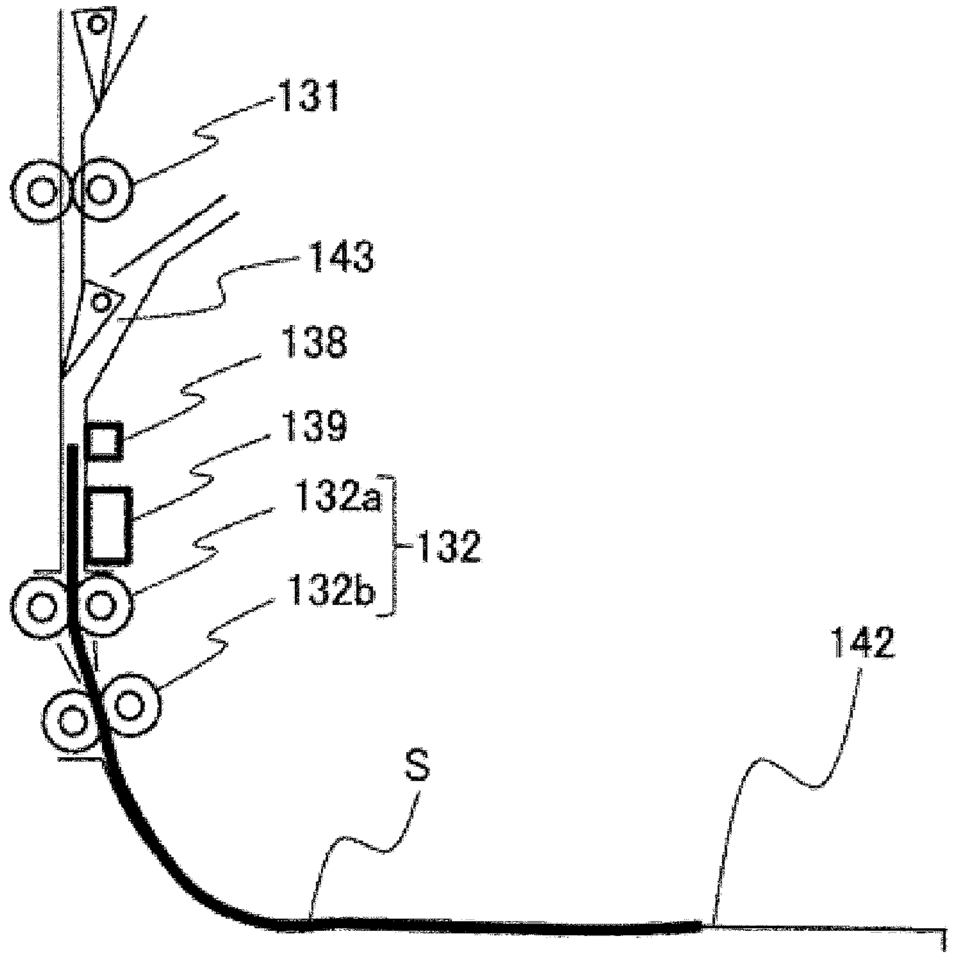
FIG. 8B is a schematic view showing a state in which the sheet is at rest by the reverse shifting portion.

Subsequently, as shown in FIG. 8B, on the basis of a detection result of the reverse sensor 138, the controller 200 stops drive of the reverse driving motor 136 at a position in which a trailing end of the sheet S advances from the switching member 143 by a predetermined distance, and thus stops the sheet S (step S203).

After the sheet S is stopped, the controller 200 moves, in the widthwise direction W by the shift amount (L3−g3), the reverse shift portion 132 nipping the sheet S through the shift controller 208 and the reverse shift motor 136. By this, the sheet S can be moved in the widthwise direction W by the shift amount (L3−g3) (step S204).

In parallel to such a shifting operation, the controller 200 reverses rotation of the reverse driving motor 136 (step S205). By this, switch-back of the sheet S by the first reverse shift roller pair 132*a* and the second reverse shift roller pair 132*b* of the reverse shift portion 132 is carried out. That is, the sheet S is fed in a first direction A1 (FIG. 8A) and thereafter is fed in a second direction A2 (FIG. 8C) opposite to the first direction A1.

Figure 8C:
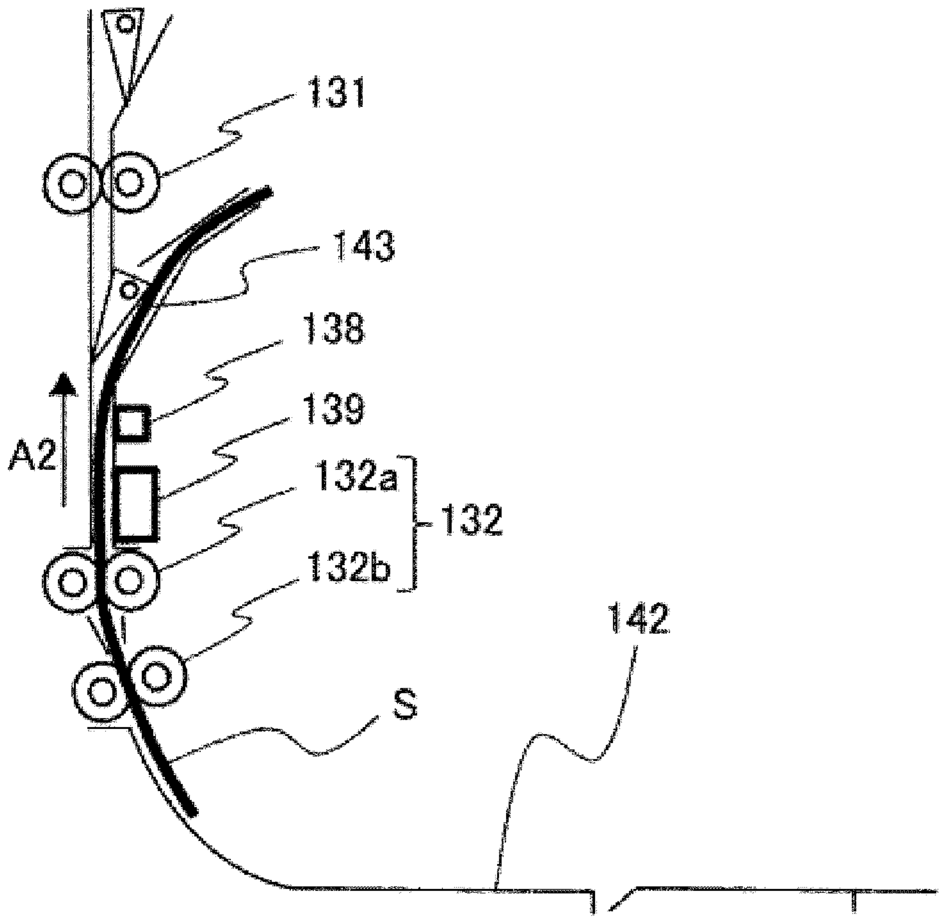
FIG. 8C is a schematic view showing a state in which the reversed sheet is fed.

The sheet S is guided by a reversing guide 142 as a guiding member while slide-contacting the reversing guide 142 at the time of the switch-back operation. At this time, the first surface of the sheet S on which the image is formed slide-contacts the reversing guide 142. On a side opposite from the reversing guide 142, a guiding member is not provided, so that the second surface side of the sheet S guided by the reversing guide 142 is not guided by another guiding member. Then, the sheet S is guided, as shown in FIG. 8C, to the second double-side feeding unit 150 by the switching member 143, so that image formation on the second surface is carried out.

Next, the controller 200 discriminates whether or not a subsequent sheet exists (step S206). In the case where the controller 200 discriminates that there is no subsequent sheet (step S206: No), the shifting operation by the reverse feeding unit 130 is ended. Further, in the case where the controller 200 discriminates that the subsequent sheet exists (step S216: Yes), the controller 200 returns the reverse shift portion 132 to the home position (center position) (step S207). Thereafter, the sequence returns to the process of the step S201.

Incidentally, in this embodiment, the step S205 is performed after the step S204, but this order may also be reversed or these steps are performed simultaneously.

[Second Double-Side Feeding Unit]

Figure 9:
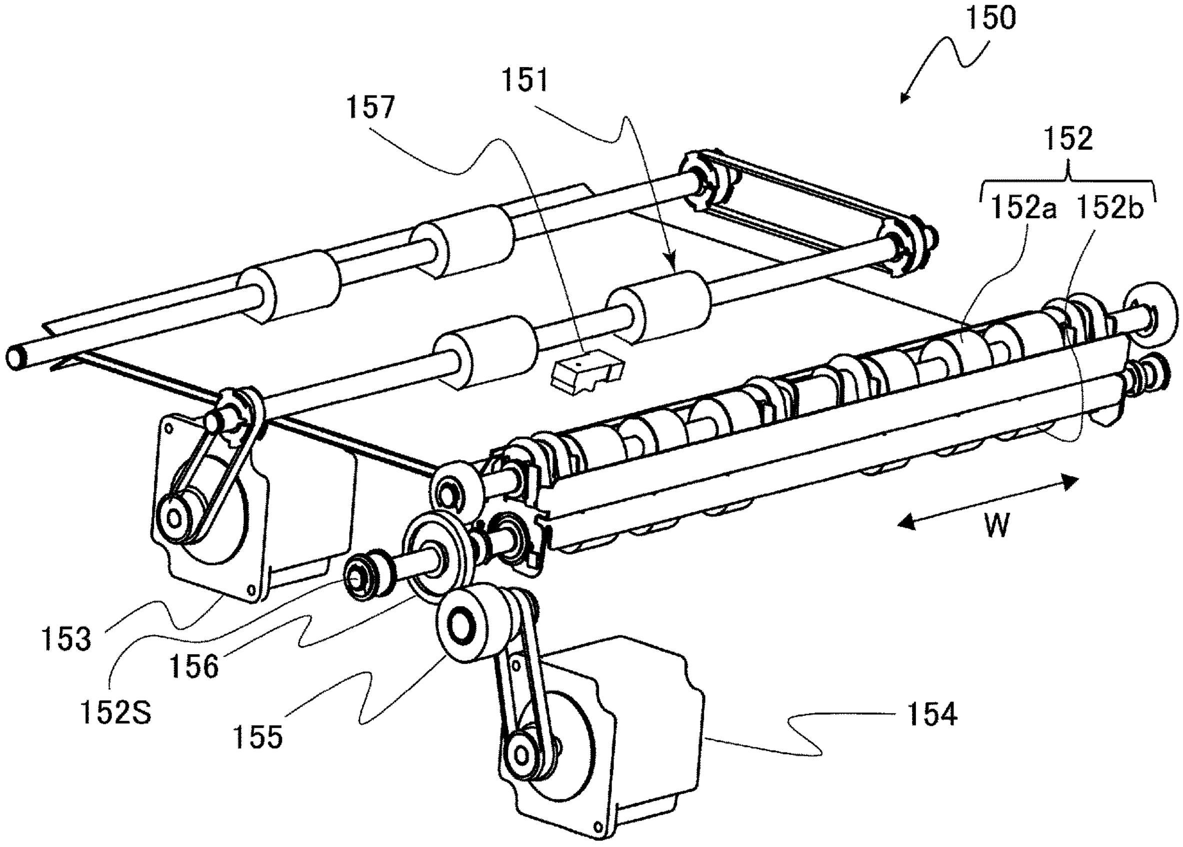
FIG. 9 is a perspective view showing a second double-side feeding unit.

Next, a structure of the second double-side feeding unit 150 will be described. The second double-side feeding unit 150 as a double-side feeding unit includes, as shown in FIG. 9, a second registration roller pair 152 as a second oblique movement correcting portion, a second pre-registration roller pair 151 and a second registration sensor 157. The second pre-registration roller pair 151 is disposed upstream of the second registration roller pair 152 with respect to the widthwise direction A, and the second registration sensor 157 is disposed between these roller pairs.

The second registration roller pair 152 includes an upper roller 152*a* and a lower roller 152*b* fixed on a rotation shaft 152S. To the rotation shaft 152, an input gear 156 is fixed, and the input gear 156 is driven by a second registration driving motor 154 through an idler gear 155. Further, the second pre-registration roller pair 151 is driven by a second pre-registration driving motor 153.

The second double-side feeding unit 150 is provided in the casing 1B, and makes oblique movement correction before the surface S is discharged from the casing 1B to the casing 1A. Incidentally, in second oblique movement correction, the sheet S is subjected to the oblique movement correcting operation but is not subjected to the shifting operation.

[Oblique Movement Correcting Operation by Second Double-Side Feeding Unit]

Figure 10:
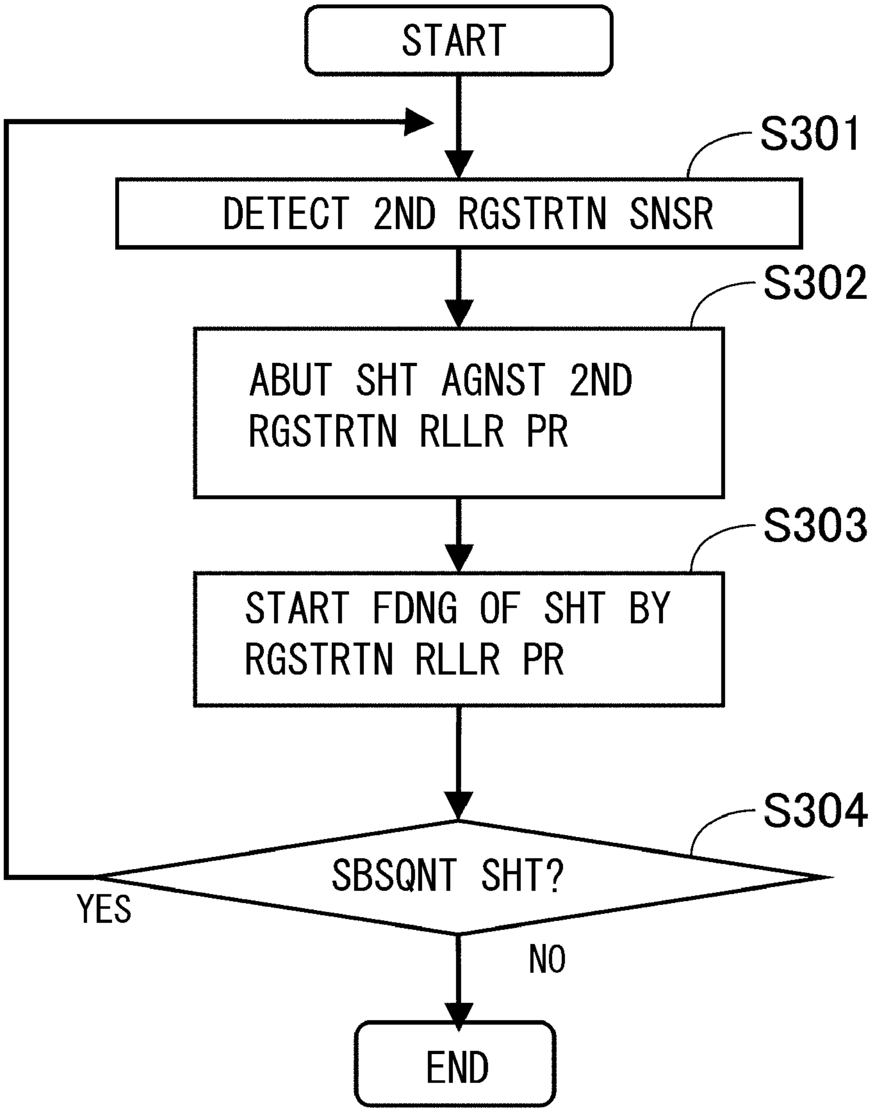
FIG. 10 is a flowchart showing an oblique movement correcting operation of the sheet by the second double-side feeding unit.

Subsequently, an oblique movement correcting operation (second oblique movement correcting operation) by the second double-side feeding unit 150 will be described along a flowchart shown in FIG. 10. In the case where the print job is double-side printing, the sheet S on which the image is formed on the first surface is subjected to the shifting operation by the reverse feeding unit 130 as described above. Then, the position of the sheet S sent from the reverse feeding unit 130 to the double-side feeding unit 150 with respect to the feeding direction A is detected by the second registration sensor 157 (step S301).

Next, on the basis of a detection result of the second registration sensor 157, the controller 200 sends the sheet S in a set sending amount by the second pre-registration roller pair 151. By this, the sheet S is abutted against the second registration roller pair 152 being at rest, so that flexure of the sheet S in a predetermined amount is formed (step S302). Thus, the oblique movement correction of the sheet S is made, and then the sheet S is nipped and fed by the second registration roller pair 152 of which rotational drive is started (step S303).

Next, the controller 200 discriminates whether or not a subsequent sheet exists (step S304). In the case where the controller 200 discriminates that there is no subsequent sheet (step S304: No), the oblique movement correcting operation by the second double-side feeding unit 150 is ended. Further, in the case where the controller 200 discriminates that the subsequent sheet exists (step S304: Yes), the sequence returns to the process of the step S301.

As described above, in this embodiment, in the double-side print job, after the image is formed on the first surface of the sheet S, the shifting operation is performed at two portions of the reverse feeding unit 130 and the registration unit 30. For this reason, the shift amount of the sheet S can be distributed to the shifting operations at the two portions. Further, by performing the shifting operation in the reverse feeding unit 130, rollers other than the reverse shift portion 132 performing the shifting operation do not nip the sheet S. That is, irrespective of the size of the sheet S, the sheet is prevented from constituting a resistance by being nipped by the rollers other than the reverse shift portion 132, so that the shifting operation can be stably performed.

Further, as regards the sheet S subjected to switch-back by the reverse shift portion 132, the first surface on which the image is formed is guided by the reverse guide 142. Further, on a side opposing the reverse guide 142, a guiding member is not provided, so that the first surface which is a non-image surface of the sheet is not guided by the guiding member. An image surface on which the image is formed. For this reason, the resistance is small even in the shifting operation.

In addition, the reverse shift portion 132 simultaneously shifts the first reverse sheet roller pair 132*a* and the second reverse shift roller pair 132*b* in the widthwise direction W. Thus, by performing the shifting operation in a state in which the sheet S is nipped by two pairs of the roller pairs, a degree of the oblique movement due to occurrence of a slip between the sheet S and the rollers during the shifting operation is reduced, so that a stable shifting operation can be performed. Accordingly, degrees of the oblique movement and the lateral deviation are reduced, so that it is possible to obtain a high-quality product. Particularly, in this embodiment, during image formation on the second surface of the first sheet in the job, it is possible to reduce the degrees of the oblique movement and the lateral deviation. For this reason, compared with a device (apparatus) in which a position of a subsequent sheet is corrected on the basis of a position of a current sheet, it is possible to obtain a high-quality product.

Further, the shifting amount of each of the reverse feeding unit 130 and the registration unit 30 becomes small, and therefore, a time required for returning the roller pair to the home position after the shifting operation becomes short, so that productivity can be improved.

Further, the registration unit 30 is provided in the casing 1A, and the reverse feeding unit 130 is provided in the casing 1B. Thus, by performing the shifting operations in separate casings, the lateral deviation can be corrected in each of the casings. Further, after the lateral deviation is corrected in each of the casings, the sheet S is fed to another casing, and therefore, the shift amount of the sheet S in each of the casings can be reduced. For this reason, a length of the guiding member, with respect to the widthwise direction W, forming each of the feeding passages can be suppressed, so that cost reduction and space saving can be realized.

Further, in this embodiment, in the double-side print job, after the image is formed on the first surface of the sheet S, the oblique movement correcting operation is performed at two portions of the double-side feeding unit 150 and the registration unit 30. For this reason, the oblique movement correction amount of the sheet S can be distributed to the oblique movement correcting operations at these two portions, so that the oblique movement correction amount at each of the portions can be reduced. The oblique movement correcting operation flexes the sheet S, and therefore, in the case where the oblique movement correction amount is large, the sheet S is distorted and causes a crease in some instances. However, in this embodiment, the oblique movement correction amount can be reduced, so that the crease of the sheet S can be suppressed.

Further, the registration unit 30 is provided in the casing 1A, and the double-side feeding unit 50 is provided in the casing 1B. Thus, by performing the oblique movement correcting operations in separate casings, the oblique movement can be corrected in each of the casings. Then, after the oblique movement is corrected in each of the casings, the sheet S is fed to another casing, and therefore, an oblique movement correction amount in each of the casings can be reduced. For this reason, necessary oblique movement correcting power in each of the casings can be defined, so that it is possible to select an oblique movement correcting mechanism providing an optimum oblique movement correction amount without excess and deficiency.

Second Embodiment

Next, a second embodiment of the present invention will be described, but in the second embodiment, in the reverse feeding unit 130, the shifting operation is not performed, and in the second double-side feeding unit 180, the oblique movement correcting operation and the shifting operation are performed. For this reason, constituent elements similar to those in the first embodiment will be omitted from illustration or will be described by adding the same reference numerals or symbols to the drawings.

[Second Double-Side Feeding Unit]

Figure 11:
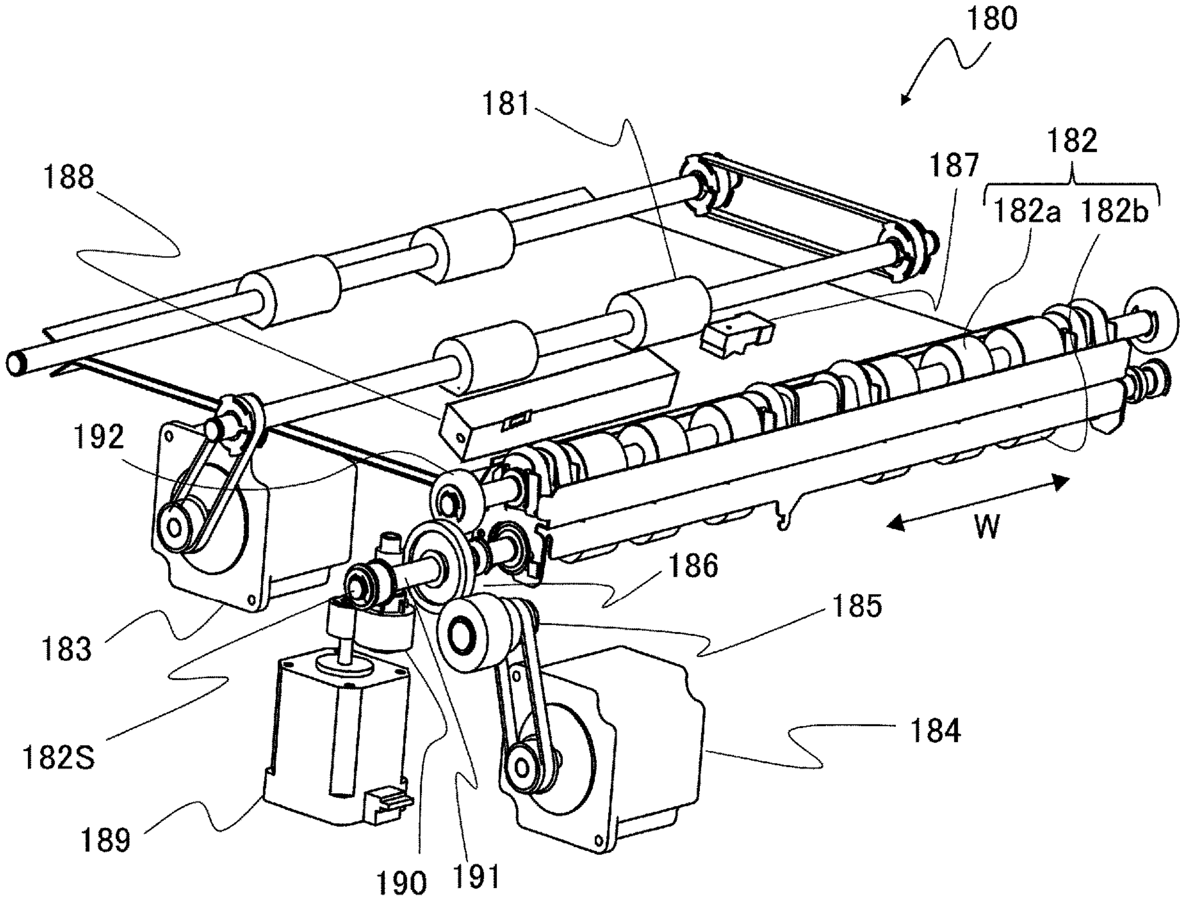
FIG. 11 is a perspective view showing a second double-side feeding unit in a second embodiment.

First, a structure of the second double-side feeding unit 180 in a second embodiment will be described. The second double-side feeding unit 180 includes, as shown in FIG. 11, a second registration roller pair 182 and a second pre-registration roller pair 181. Further, the second double-side feeding unit 180 includes a second registration sensor 187 and a second CIS 188. The second pre-registration roller pair 181 is disposed upstream of the second registration roller pair 182 with respect to a sheet feeding direction A, and the second registration sensor 187 and the second CIS 188 are disposed between these roller pairs.

The second registration roller pair 182 which is a rotatable member pair includes an upper roller 182*a* as a second roller and a lower roller 182*b* as a fourth roller fixed on a rotation shaft 182S. To the rotation shaft 182S, an input gear 186 is fixed, and the input gear 186 is driven by a second registration driving motor 184 through an idler gear 185. Further, the second pre-registration roller pair 181 is driven by a second pre-registration driving motor 183. Incidentally, each of the second pre-registration roller pair 181 and the second registration roller pair 182 rotates about a shift extending in a widthwise direction W.

On the rotation shaft 182S, a rack 191 is supported so as not to be rotatable relative to the rotation shaft 182S and so as not to be movable in an axial direction of the rotation shaft 182S. The rack 191 receives a driving force from a second shift motor 189 through a pinion gear 190 and shifts the rotation shaft 182S in the axial direction. Further, the upper roller 182*a* shifts in the axial direction in interrelation with the lower roller 182*b* in a state in which a flange portion 192 provided integrally with the upper roller 182*a* is nipped by the input gear 186 of the lower roller 182*b*. The second registration roller pair 182 in a state in which the sheet S is nipped thereby moves in the widthwise direction W, so that the sheet S moves in the widthwise direction W and a position of the sheet S with respect to the widthwise direction W is corrected.

Incidentally, compared with the input gear 186, the idler gear 185 is broad in face width. This is because even in the case where the second registration roller pair 182 and the input gear 186 move in the widthwise direction W, engagement between the gears is maintained and thus rotation of the second registration roller pair 182 is enabled.

Further, the second CIS 188 as a second detecting portion is disposed at a position biased to one end side relative to a center of a feeding passage with respect to the widthwise direction W similarly as in the case of the CIS 34 (FIG. 2). Further, the second CIS 188 is disposed in the neighborhood of the second registration roller pair 182 to the extent possible so as not to lower detection accuracy of the second CIS 188.

[Control Block]

Figure 12:
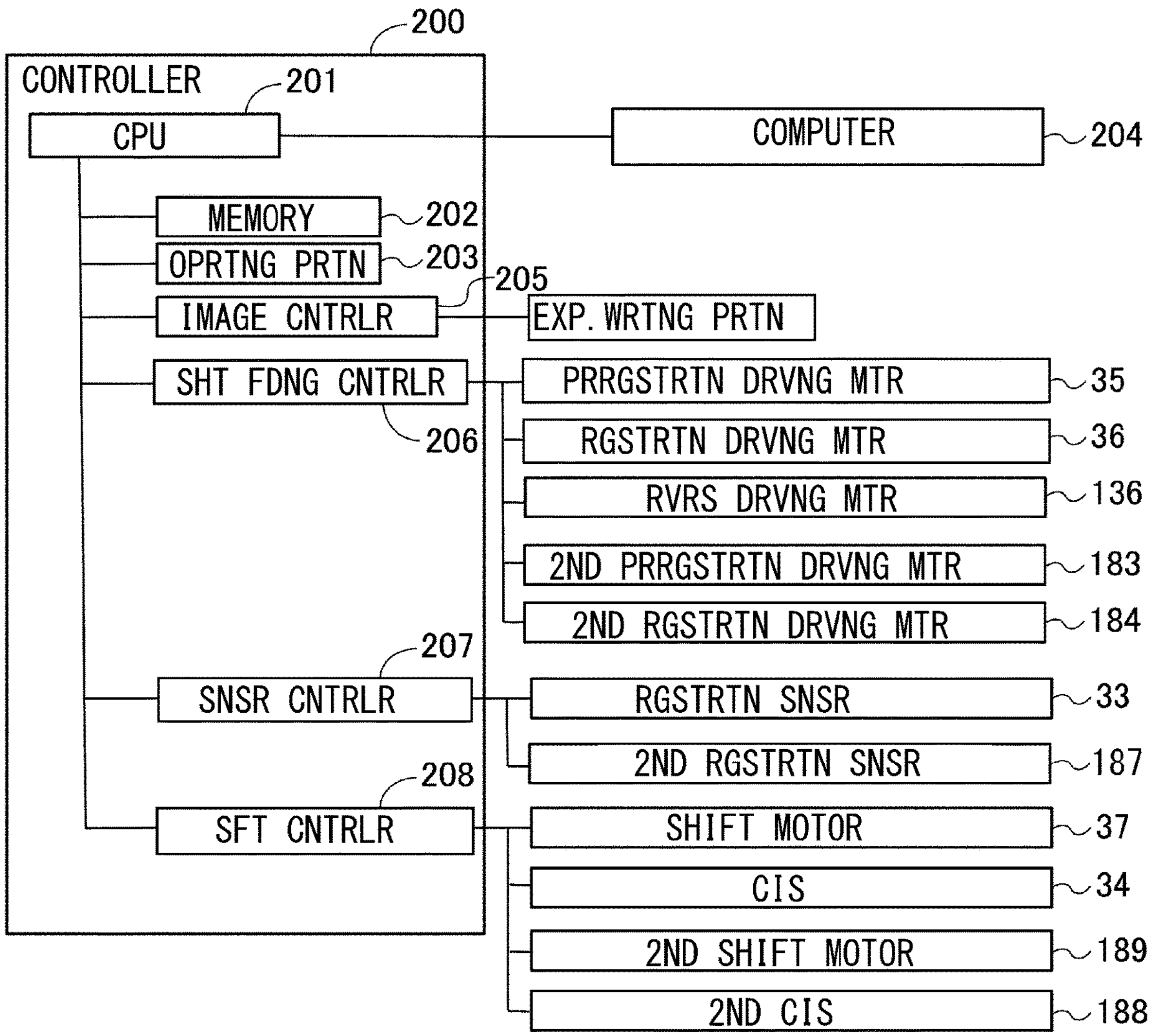
FIG. 12 is a control block diagram showing a controller.

FIG. 12 is a control block diagram showing the controller 200 of the image forming apparatus 1 according to the second embodiment. The sheet feeding controller 206 provides instructions to the pre-registration driving motor 35, the registration driving motor 36, a reverse driving motor 136, a second pre-registration driving motor 183, and a second registration driving motor 184, and the like. By this, a feeding operation of the sheet S is controlled. The sensor controller 207 provides instruction to start and stop detection by the registration sensor 33, and a second registration sensor 187, and the like, and receives detection results of these sensors.

The shift controller 208 receives results of the CIS 34 and the second CIS 188 and provides instructions to start and stop the shift motor 37 and a second shift motor 189 and the like instruction, and thus controls movement of the sheet S in the widthwise direction W, i.e., a shift operation.

[Oblique Movement Correcting Operation and Shift Operation by Second Double-Side Feeding Unit]

Figure 13:
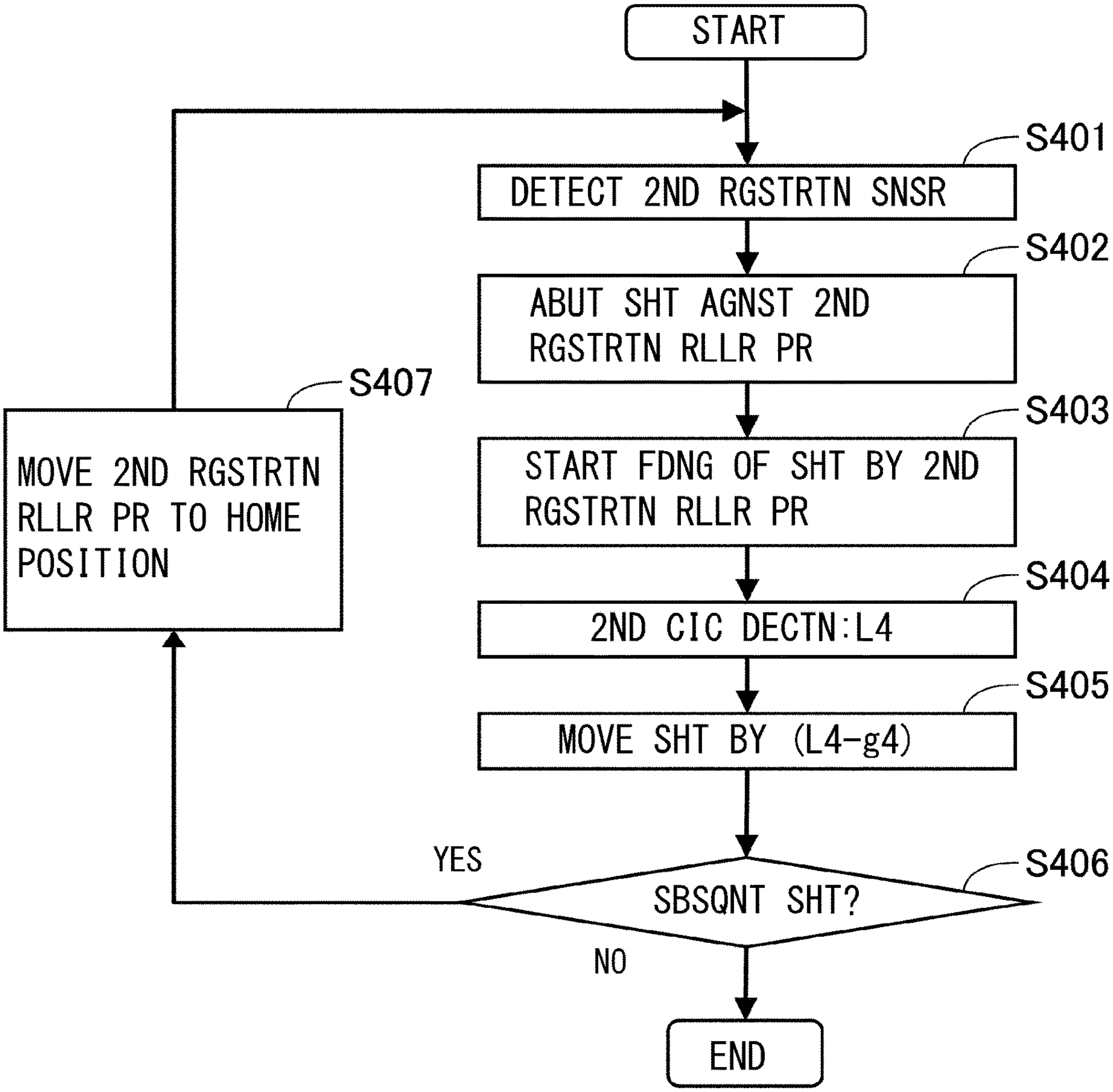
FIG. 13 is a flowchart showing an oblique movement correcting operation and a shifting operation of the sheet by the second double-side feeding unit.

Next, along a flowchart shown in FIG. 13, an oblique movement correcting operation (second oblique movement correcting operation) and a shift operation by the registration unit 30 will be described. In the case where the print job is double-side printing, the sheet S on which the images is formed on the first surface is subjected to switch-back in the reverse feeding unit 130. Incidentally, in this embodiment, in the reverse feeding unit 130, the shifting operation is not performed. Then, the position of the sheet S sent from the reverse feeding unit 130 to the double-side feeding unit 180 with respect to the feeding direction A is detected by the second registration sensor 187 (step S401).

Next, on the basis of a detection result of the second registration sensor 187, the controller 200 sends the sheet S in a set sending amount by the second pre-registration roller pair 181. By this, the sheet S is abutted against the second registration roller pair 182 being at rest, so that flexure of the sheet S in a predetermined amount is formed (step S402). Thus, the oblique movement correction of the sheet S is made, and then the sheet S is nipped and fed by the second registration roller pair 182 of which rotational drive is started (step S403).

Thereafter, an end portion position of the sheet S is detected by the second CIS 188 (step S404). The controller 200 calculates the shift amount of the sheet S on the basis of this detection result (L4) and a deviation amount (g4). The deviation amount (g4) is an amount which is acquired in advance during installation of the image forming apparatus 1 or the like and in which the sheet S is shifted in the widthwise direction W when the sheet S is fed from the second double-side feeding unit 180 to the registration unit 30. Further, the shift amount of the sheet S can be obtained by subtracting the deviation amount (g4) from the detection result (L4) of the second CIS 188 (L4−g4).

Then, the controller 200 moves the second registration roller pair 182 nipping the sheet S in the widthwise direction W through the shift controller 208 and the second shift motor 189 by the shift amount (L4−g4).

Next, the controller 200 discriminates whether or not a subsequent sheet exists (step S406). In the case where the controller 200 discriminates that there is no subsequent sheet (step S406: No), the oblique movement correcting operation and the shifting operation by the second double-side feeding unit 180 are ended. Further, in the case where the controller 200 discriminates that the subsequent sheet exists (step S406: Yes), the controller 200 returns the second registration roller pair 182 to the home position (center position) (step S401). Thereafter, the sequence returns to the process of the step S401.

As described above, in this embodiment, in the double-side print job, after the image is formed on the first surface of the sheet S, the oblique movement correcting operation and the shifting operation is performed at two portions of the second double-side feeding unit 180 and the registration unit 30, respectively.

Further, the second double-side feeding unit 180 is disposed in the neighborhood of an outlet from the casing 1B toward the casing 1A, so that the oblique movement amount of the sheet S discharged from the casing 1B and the position of the sheet S with respect to the widthwise direction W can be made clearer than in the first embodiment.

Other Embodiment

Incidentally, in the first embodiment, not only the shifting operation was performed in the reverse feeding unit 130, but also the oblique movement correcting operation was performed in the second double-side feeding unit 150. Further, in the second embodiment, the shifting operation and the oblique movement correcting operation were performed in the second double-side feeding unit 180. However, the present invention is not limited to these embodiments. That is, at least one of the shifting operation and the oblique movement correcting operation may only be required to be performed in the re-feeding unit 500. Further, execution of these shifting operation and oblique movement correcting operation in which unit is not limited. For example, the oblique movement correcting operation and the shifting operation may also be performed in the reverse feeding unit 130, and only the shifting operation may also be performed in the first double-side feeding unit 70.

Further, in the first embodiment, both the first reverse shift roller pair 132*a* and the second reverse shift roller pair 132*b* of the reverse shift portion 132 were constituted so as to be movable in the widthwise direction W, but the present invention is not limited thereto. For example, only either one of the first reverse shift roller pair 132*a* and the second shift roller pair 132*b* may also be constituted so as to be movable in the widthwise direction W. Further, the second reverse shift roller pair 132*b* may also be omitted and the sheet S may also be moved only by the first reverse shift roller pair 132*a* while being nipped by the first reverse shift roller pair 132*a*.

Further, in place of the CIS 34, the reverse CIS 139 and the second CIS 188, a CCD sensor or a CMOS sensor may also be used, and when the position of the sheet with respect to the widthwise direction can be detected by these sensors, the end portion position of the sheet with respect to the widthwise direction need not to be detected.

Further, in place of a type in which the oblique movement of the sheet is corrected by abutting the sheet against the registration roller pair 32 or the second registration roller pair 182, a type in which the sheet is abutted against a shutter member provided upstream of the roller pair with respect to the feeding direction may also be applied.

Further, in either embodiment described above, description was made by using the image forming apparatus 1 of the electrophotographic type, but the present invention is not limited thereto. For example, the present invention is also applicable to an image forming apparatus of an ink jet type in which the image is formed on the sheet by ejecting an ink liquid through nozzles.

The present invention can also be realized in a process in which a program for realizing one or more function of the above-described embodiments is supplied to a system or a device (apparatus) through a network or a storing medium and in which one or more processor in a computer in the system or the device reads and executes the program. Further, the present invention can also be realized by a circuit (for example, ASIC) for realizing one or more function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-095408 filed on Jun. 1, 2020, which is hereby incorporated by reference herein in its entirety.

What is claimed is:

1. An image forming apparatus comprising:

an image forming portion configured to form an image on a sheet;

an oblique movement correcting portion provided upstream of said image forming portion with respect to a sheet feeding direction and including (1) a first registration roller pair for correcting oblique movement of the sheet by abutting a leading end of the sheet against said first registration roller pair and (2) first moving means for moving the sheet in a widthwise direction of the sheet perpendicular to the sheet feeding direction in a state in which the sheet is nipped in said first registration roller pair;

a reversing portion configured to reverse the leading end and a trailing end of the sheet on which the image is formed on a first surface by said image forming portion;

a re-feeding portion configured to re-feed the sheet having been reversed by said reversing portion toward said oblique movement correcting portion; and a controller, wherein said reversing portion includes (1) a reversing roller pair for reversing the sheet by rotating in a first direction while nipping the sheet and then by rotating in a second direction opposite to the first direction, and (2) second moving means for moving the sheet in the widthwise direction in a state in which the sheet is nipped by said reversing roller pair, wherein said re-feeding portion includes a second registration roller pair for correcting the oblique movement of the sheet by abutting the leading end of the sheet against said second registration roller pair, and wherein the controller is configured to perform control such that when an image is to be formed on a second surface of the sheet opposite from the first surface of the sheet, (1) a side end position of the sheet is corrected by said second moving means, and (2) then the oblique movement of the sheet is corrected by said second registration roller pair, and (3) then the side end position of the sheet is corrected again by said first moving means and the sheet is fed to said image forming portion.

2. An image forming apparatus according to claim 1, wherein when the image is formed on the second surface of the sheet, (1) the side end portion of the sheet is corrected by said second moving means, and (2) then the oblique movement of the sheet is corrected by said second registration roller pair, and (3) then the oblique movement of the sheet is corrected by said first registration roller pair, and (4) then the side end portion of the sheet is corrected again by said first moving means and the sheet is fed to said image forming portion.

3. An image forming apparatus according to claim 1, further comprising a second reversing roller pair provided downstream of said reversing roller pair with respect to the feeding direction, and wherein when the sheet is moved by said second moving means, the sheet is nipped and fed by both said reversing roller pair and said second reversing roller pair.

4. An image forming apparatus according to claim 1, further comprising:

a first side end detecting portion, provided upstream of said first registration roller pair with respect to the feeding direction, for detecting a position of a side end portion of the sheet with respect to the widthwise direction; and a second side end detecting portion, provided upstream of said reversing roller pair with respect to the feeding direction, for detecting the position of the side end portion of the sheet with respect to the widthwise direction, wherein said first registration roller pair moves the sheet in the widthwise direction by said first moving means on the basis of a detection result of said first side end detecting portion, and wherein said reversing roller pair moves the sheet in the widthwise direction by said second moving means on the basis of a detection result of said second side end detecting portion.

5. An image forming apparatus according to claim 1, further comprising a feeding passage for guiding the sheet fed in the feeding direction, wherein said first registration roller pair and said reversing roller pair move the sheet by said first moving means and said second moving means, respectively, so that a center of said feeding passage and a center of the sheet coincide with each other with respect to the widthwise direction.

6. An image forming apparatus according to claim 1, further comprising:

a first casing including said image forming portion and said oblique movement correcting portion; and a second casing including said reversing portion and connected to said first casing.

7. An image forming apparatus according to claim 1, wherein said first registration roller pair includes a first roller and a second roller which are rotatable about axes thereof extending in the widthwise direction and which are movable in the widthwise direction in a state in which the sheet is nipped by said first roller and said second roller, and wherein said reversing roller pair includes a third roller and a fourth roller which are rotatable about axes thereof extending in the widthwise direction and which are movable in the widthwise direction in a state in which the sheet is nipped by said third roller and said fourth roller.

8. An image forming apparatus according to claim 3, wherein said reversing portion includes:

a feeding roller pair for feeding the sheet;

a reversing position detecting portion for detecting a trailing end of the sheet for being reversed; and a side end detecting portion for detecting a position of a side end portion of the sheet with respect to the widthwise direction, wherein from an upstream side toward a downstream side of the feeding direction, said feeding roller pair, said reversing position detecting portion, said side end detecting portion, said reversing roller pair, and said second reversing roller pair are provided in a named order.

9. An image forming apparatus according to claim 1, wherein when said reversing roller pair rotates in the second direction, the sheet is fed in the widthwise direction by said second moving means.

* * * * *